(12) United States Patent
Yoo et al.

(10) Patent No.: US 11,308,326 B2
(45) Date of Patent: Apr. 19, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Taehwan Yoo, Suwon-si (KR); Kyungsu Kim, Suwon-si (KR); Ganghui Lee, Suwon-si (KR); Hyungmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 16/686,570

(22) Filed: Nov. 18, 2019

(65) Prior Publication Data
US 2020/0193161 A1      Jun. 18, 2020

(30) Foreign Application Priority Data

Dec. 18, 2018   (KR) .................. 10-2018-0163834

(51) Int. Cl.
*G06K 9/00* (2006.01)
*G06K 9/46* (2006.01)
*G06K 9/62* (2022.01)

(52) U.S. Cl.
CPC ..... *G06K 9/00671* (2013.01); *G06K 9/00335* (2013.01); *G06K 9/00718* (2013.01); *G06K 9/46* (2013.01); *G06K 9/6256* (2013.01)

(58) Field of Classification Search
CPC .......... G06K 9/00671; G06K 9/00335; G06K 9/00718; G06K 9/46; G06K 9/6256;
(Continued)

(56) References Cited

U.S. PATENT DOCUMENTS 9,207,768 B2 *  12/2015  Kang ................. H04N 5/23218
9,449,415 B2     9/2016  Peterson et al.
(Continued)

FOREIGN PATENT DOCUMENTS

JP       2009-136606       6/2009
JP       2011-132382       7/2011

OTHER PUBLICATIONS

Okumura, Tsukasa, et al. "Cooking activities recognition in egocentric videos using hand shape feature with openpose." In Proceedings of the Joint Workshop on Multimedia for Cooking and Eating Activities and Multimedia Assisted Dietary Management, pp. 42-45. 2018. (Year: 2018).*

(Continued)

*Primary Examiner* — Carol Wang
(74) *Attorney, Agent, or Firm* — Nixon & Vanderhye P.C.

(57) ABSTRACT

An electronic apparatus and a controlling method thereof are provided. The controlling method according to an embodiment includes acquiring contents and storing the contents in a memory, identifying a first section of the contents related to a first behavior by analyzing the stored contents, outputting contents of the identified first section, acquiring a user image captured while the contents of the first section is output, identifying whether the first behavior is completed by analyzing the user image, and based on identifying that the user has completed the first behavior, outputting contents of a second section, the second section being a next section of the first section.

18 Claims, 16 Drawing Sheets

(58) Field of Classification Search
CPC ............. G06K 9/6267; G06K 9/00355; G06K 2009/00738; G09B 5/065; G06F 3/011; G06F 3/005; H04N 21/44218; H04N 21/47217; G06N 20/00
See application file for complete search history.

(56) References Cited

U.S. PATENT DOCUMENTS

| | | | | |
|---|---|---|---|---|
| 9,684,372 | B2* | 6/2017 | Xun | ............... G06F 3/017 |
| 9,898,654 | B2 | 2/2018 | Castelli et al. | |
| 9,911,351 | B2* | 3/2018 | White | ............... G06F 3/0304 |
| 2009/0259687 | A1 | 10/2009 | Do et al. | |
| 2011/0039659 | A1 | 2/2011 | Kim et al. | |
| 2014/0078531 | A1* | 3/2014 | Park | ............... H04N 1/00954 358/1.13 |
| 2016/0372005 | A1 | 12/2016 | Bajpai et al. | |
| 2018/0232202 | A1 | 8/2018 | Tagawa et al. | |
| 2020/0026910 | A1* | 1/2020 | Wang | ............... G06K 9/6256 |

OTHER PUBLICATIONS

Ji, Yanli, Yoshiyasu Ko, Atsushi Shimada, Hajime Nagahara, and Rin-ichiro Taniguchi. "Cooking gesture recognition using local feature and depth image." In Proceedings of the ACM multimedia 2012 workshop on Multimedia for cooking and eating activities, pp. 37-42. 2012. (Year: 2012).*

Bansal, Shubham, Shubham Khandelwal, Shubham Gupta, and Dushyant Goyal. "Kitchen activity recognition based on scene context." In 2013 IEEE International Conference on Image Processing, pp. 3461-3465. IEEE, 2013. (Year: 2013).*

Extended Search Report and Written Opinion dated Apr. 29, 2020 in counterpart European Patent Application No. 19210490.9.

European Examination Report dated Oct. 28, 2021 for EP Application No. 19210490.9.

Koprinska et al., "Temporal Video segmentation: A survey"; XP 004224651, Signal Processing: Image Communication 16 (Jan. 1, 2001) pp. 477-500, vol. 16, No. 5.

* cited by examiner

FIG. 8C
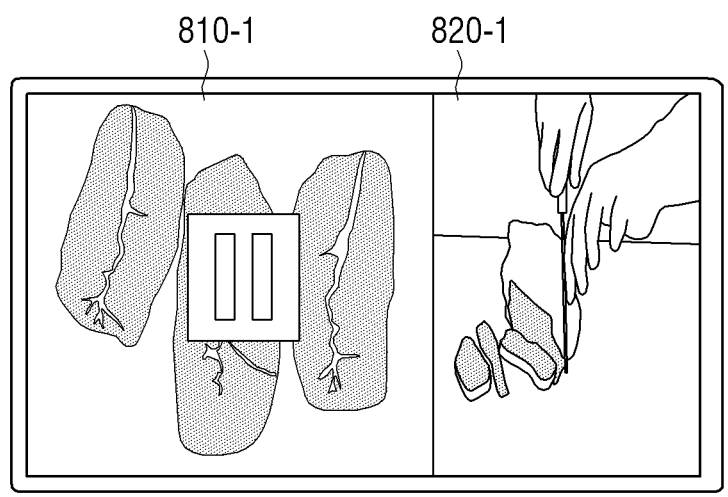
(a)
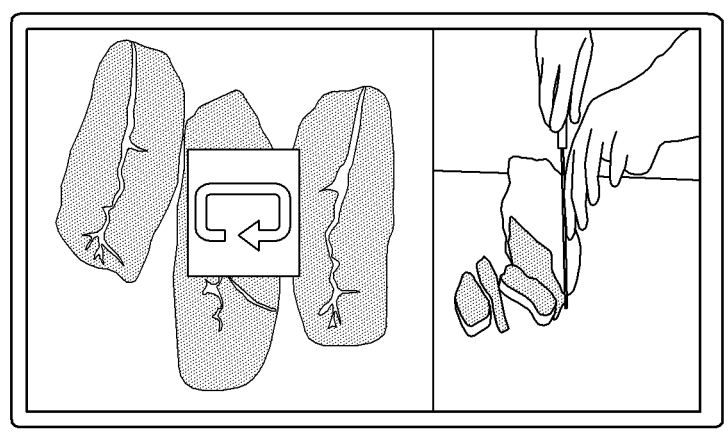
(b)

FIG. 8D
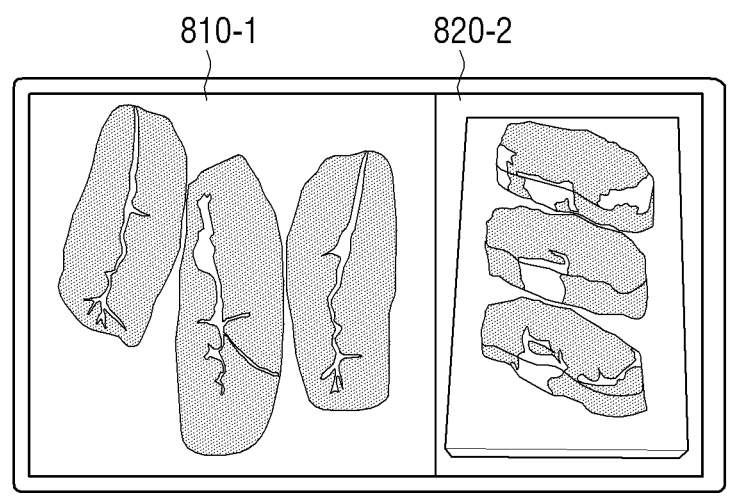
(a)
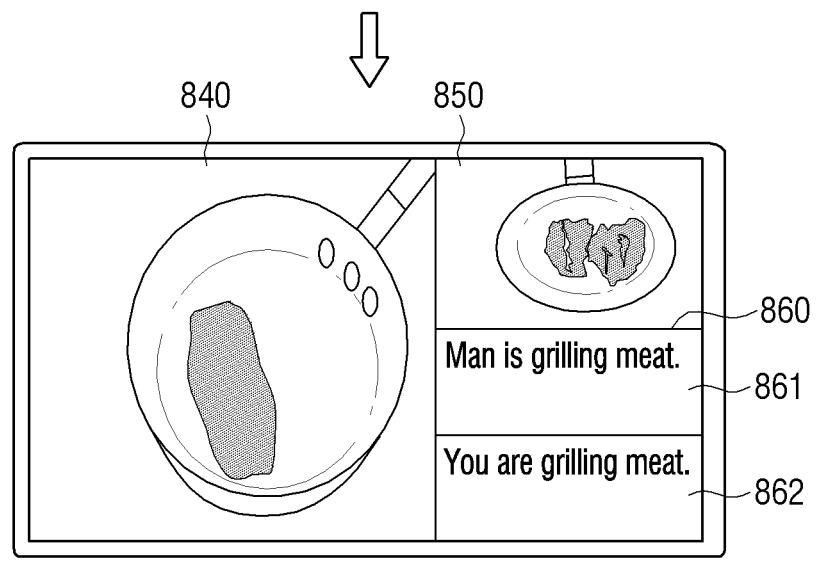
(b)

FIG. 9
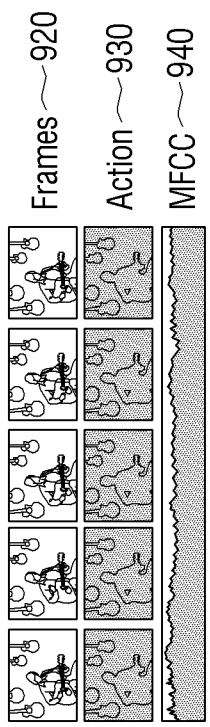
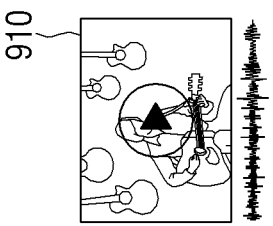
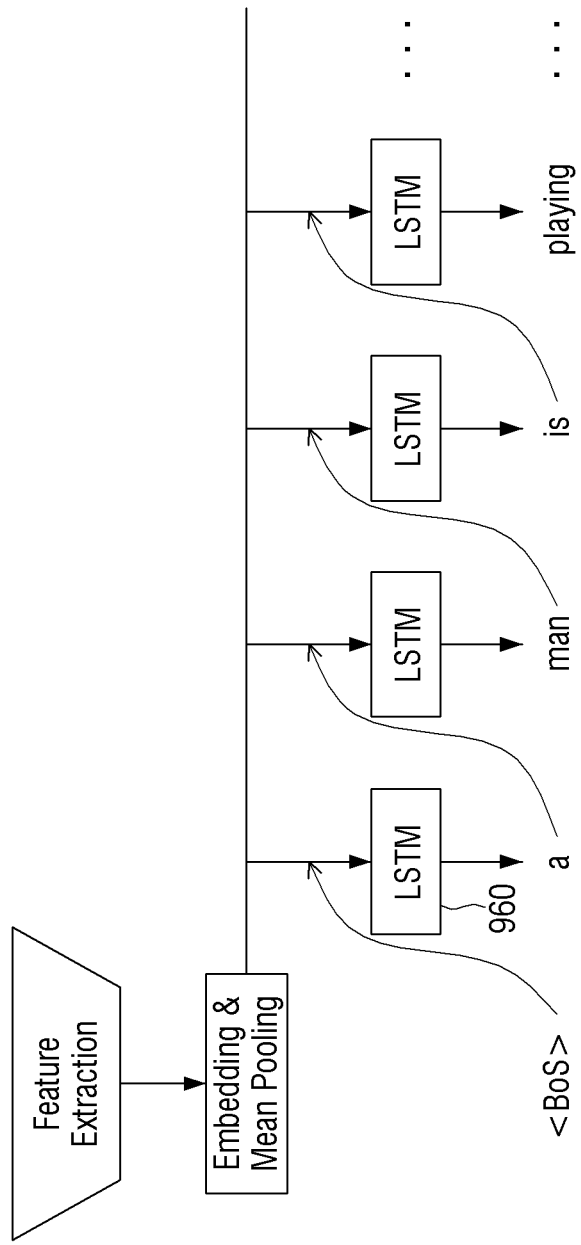

ELECTRONIC APPARATUS AND CONTROLLING METHOD THEREOF

CROSS-REFERENCE TO RELATED APPLICATION

This application is based on and claims priority under 35 U.S.C. § 119 to Korean Patent Application No. 10-2018-0163834, filed on Dec. 18, 2018 in the Korean Intellectual Property Office, the disclosure of which is incorporated by reference herein in its entirety.

BACKGROUND

1. Field

The disclosure relates to an electronic apparatus and a controlling method thereof and for example, to an electronic apparatus that outputs contents automatically based on a user behavior and a controlling method thereof.

2. Description of Related Art

With the development of the communication technology and the user interface of an electronic apparatus, a user may easily receive necessary information through the electronic apparatus without any restriction of the place and time.

For example, an electronic apparatus such as a smart TV not only plays back an image requested by a user but also selects and provides only an image of a section suitable for the user's intention from the image requested by the user.

As such, various service-related technologies have been developed. Recently, a service for providing images (e.g., exercise, education, game, cooking, etc.) that allow a user's participation through an electronic apparatus is provided.

However, the user who uses such an image service that allows the user's participation may not perform required operations or acquire necessary information in accordance with the progress speed of the image that he or she requested and thus, the user needs to perform a control operation related to the reproduction of the corresponding image through the electronic apparatus.

SUMMARY

Embodiments of the disclosure provide and electronic apparatus and method to control the output of contents automatically in consideration of a user behavior in an electronic apparatus.

An example aspect of the various example embodiments relates to a method of controlling an electronic apparatus including acquiring contents and storing the contents in a memory, identifying a first section of the contents related to a first behavior by analyzing the stored contents, outputting contents of the identified first section, acquiring a user image captured while the contents of the first section is output, identifying whether the first behavior is completed by analyzing the user image, and based on identifying that the user has completed the first behavior, outputting contents of a second section, the second section being a next section of the first section.

The identifying a first section may include inputting an image frame of an image included in the contents to a trained AI model and acquiring a feature value of the input image frame, performing a scene understanding related to the first behavior based on the acquired feature value, and identifying a first section related to the first behavior based on the performed scene understanding.

The acquiring a user image may include inputting an image frame of the user image to the trained AI model and acquiring a feature value of the input image frame, and performing a scene understanding regarding the user behavior included in the user image based on the acquired feature value.

The identifying whether the first behavior has been completed may include identifying whether the first behavior has been completed by comparing a feature value of an image frame of an image of the first section in the image with a feature value of an image frame of the user image.

The identifying whether the first behavior has been completed may include identifying whether the first behavior has been completed based on a scene understanding related to the first behavior and a scene understanding regarding the user behavior.

The method may further include acquiring and displaying a sentence related to an image of the first section and the user image, respectively, and the displaying may include acquiring a first sentence by performing a scene understanding regarding the first behavior included in an image of the first section, acquiring a second sentence by performing a scene understanding regarding the user behavior included in the user image, and displaying the acquired first and second sentences in an area of a display in which an image of the first section is displayed.

The identifying whether the first behavior has been completed may include identifying whether the first behavior has been completed based on a similarity level of the first and second sentences.

The outputting may include, based on identifying that the first behavior has not been completed, outputting a message informing that a behavior different from the first behavior is being performed through at least one of an image or audio.

The outputting may include, based on identifying that the first behavior has not been completed, stopping reproduction of the image or repeatedly reproducing an image of the first section.

The outputting may include, based on a behavior different from the first behavior being performed for a predetermined threshold time or longer while the reproduction of the image is stopped or an image of the first section is repeatedly reproduced, outputting an image of the second section.

The memory may include a buffer and a main memory, and the storing may include storing the contents in the buffer, and based on a storage capacity of the buffer being insufficient, storing remaining contents which are not stored in the buffer, in the main memory.

An example aspect of the various example embodiments relates to an electronic apparatus including a photographing part comprising image capturing circuitry, a memory configured to acquire contents and store the contents, an outputter comprising output circuitry configured to output the contents, and a processor configured to control the electronic apparatus to identify a first section of the contents related to a first behavior by analyzing the stored contents, and to control the outputter to output contents of the identified first section, acquire a user image captured while the contents of the first section is output, identify whether the first behavior is completed by analyzing the user image, and based on identifying that the user has completed the first behavior, control the outputter to output contents of a second section, the second section being a next section of the first section.

The processor may control the electronic apparatus to input an image frame forming an image included in the contents to a trained AI model to acquire a feature value of the input image frame, perform a scene understanding related to the first behavior based on the acquired feature value, and identify a first section related to the first behavior based on the performed scene understanding.

The processor may control the electronic apparatus to input an image frame forming the user image to the trained AI model to acquire a feature value of the input image frame, and perform a scene understanding regarding the user behavior included in the user image based on the acquired feature value.

The processor may control the electronic apparatus to identify whether the first behavior has been completed by comparing a feature value of an image frame forming an image of the first section in the image with a feature value of an image frame forming the user image.

The processor may control the electronic apparatus to identify whether the first behavior has been completed based on a scene understanding related to the first behavior and a scene understanding regarding the user behavior.

The processor may control the electronic apparatus to acquire a first sentence by performing a scene understanding regarding the first behavior included in an image of the first section, acquire a second sentence by performing a scene understanding regarding the user behavior included in the user image, and control the outputter to display the acquired first and second sentences in an area of a display in which an image of the first section is displayed.

The processor may control the electronic apparatus to identify whether the first behavior has been completed based on a similarity level of the first and second sentences.

The processor, based on identifying that the first behavior has not been completed, may control the outputter to output a message informing that a behavior different from the first behavior is being performed through at least one of an image or audio.

The processor may control the outputter to stop reproduction of the image or to repeatedly reproduce an image of the first section.

The processor, based on a behavior different from the first behavior being performed for a predetermined threshold time or longer while the reproduction of the image is stopped or an image of the first section is repeatedly reproduced, may control the outputter to output an image of the second section.

The memory may include a buffer and a main memory, and the processor may control the electronic apparatus to store the contents in the buffer, and based on a storage capacity of the buffer being insufficient, stores remaining contents which are not stored in the buffer, in the main memory.

As described above, according to an example embodiment, an electronic apparatus may automatically control the output of contents in consideration of a user behavior.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 8C is a diagram illustrating an example of automatically reproducing an image according to a user behavior in an electronic apparatus according to an embodiment;

FIG. 8D is a diagram illustrating an example of automatically reproducing an image according to a user behavior in an electronic apparatus according to an embodiment;

FIG. 9 is an diagram illustrating an example of performing a scene understanding of an image acquired in an electronic apparatus according to an embodiment;

DETAILED DESCRIPTION

Figure 1:
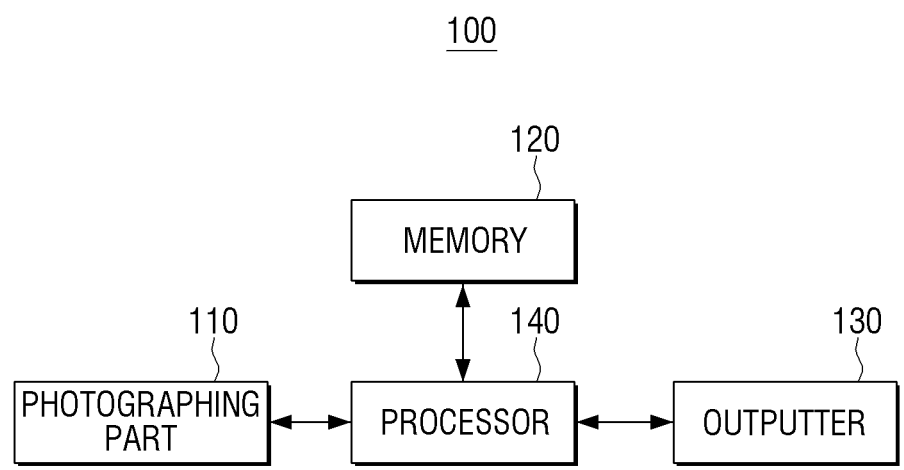
FIG. 1 is a block diagram illustrating an example electronic apparatus according to an embodiment.

Hereinafter, the present disclosure will be described in greater detail with reference to the accompanying drawings.

However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

The terms "have", "may have", "include", and "may include" used in the example embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "at least one of A or/and B" means (1) including at least one A, (2) including at least one B, or (3) including both at least one A and at least one B.

The term such as "first" and "second" used in various example embodiments may be used to refer to various elements regardless of an order and/or importance of the corresponding elements, and does not limit the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g, third element) between the certain element and the another element.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to a situation in which a device is "specifically designed to" in terms of hardware. Instead, under some circumstances, the expression "a device configured to" may refer to the device being "capable of" performing an operation together with another device or component. For example, the phrase "a processor configured to perform A, B, and C" may refer, for example, and without limitation, to a dedicated processor (e.g.: an embedded processor) for performing the corresponding operations, a generic-purpose processor (e.g.: a CPU or an application processor), or the like, that can perform the corresponding operations by executing one or more software programs stored in a memory device.

In various example embodiments, the electronic apparatus may include, for example, and without limitation, at least one of medical devices (e.g., various portable medical measurement devices such as a blood glucose meter, a heart rate meter, a blood pressure meter, or a body temperature meter), magnetic resonance angiography (MRA), magnetic resonance imaging (MRI), computed tomography (CT), camera, ultrasonic device), a navigation device, a global navigation satellite system (GNSS), an event data recorder (EDR), a flight data recorder (FDR), an automobile infotainment device, a marine electronic equipment (e.g., a marine navigation device, a gyro compass, etc.), avionics, a security device, a head part for vehicle, an industrial or domestic robot, a drone, an ATM at financial institutions, point of sales (POS) of shops, Internet of Things (IoT) Internet devices (e.g., light bulbs, various sensors, sprinkler devices, fire alarms, thermostats, street lights, toasters, exercise equipment, hot water tanks, heaters, boilers, etc.), or the like.

In this disclosure, the term "user" may indicate a person using an electronic device or an apparatus which uses an electronic device (e.g., an artificial intelligent electronic apparatus).

FIG. 1 is a block diagram illustrating an example electronic apparatus according to an embodiment.

As illustrated in FIG. 1, the electronic apparatus 100 comprises a photographing part (e.g., including image capturing circuitry) 110, a memory 120, an outputter (e.g., including output circuitry) 130, and a processor (e.g., including processing circuitry) 140.

The photographing part 110 may include various image capturing circuitry including, for example, a camera. The photographing part 110 may include various image capturing circuitry, such as, for example, and without limitation, a lens (not shown) through which an image is penetrated and an image sensor (not shown) which senses the image penetrated through the lens. The image sensor (image) may, for example, and without limitation, be implemented as a CCD image sensor, a CMOS image sensor, or the like. The image data acquired through the photographing part 110 may be processed by an image processor (not shown).

The memory 120 may temporarily store at least one of contents received from outside and contents stored in another memory of the electronic apparatus 100 or in an external memory physically connected to the electronic apparatus 100.

The contents may include, for example, and without limitation, at least one of image data, audio data, texts, or the like.

The outputter 130 may include various output circuitry and outputs contents. For example, the outputter 130 may include various output circuitry to output at least one of image data, audio data, text, etc. included in the contents, but is not limited thereto.

The processor 140 may include various processing circuitry and identifies a first section related to a first behavior by analyzing contents temporarily stored in the memory 120, and controls the outputter 130 to output the contents of the identified first section (as used herein, phrases indicating that the processor performs or is configured to perform various actions or functions include that the processor controls the electronic apparatus to perform the various functions and is not limited to the processor itself performing the various recited functions). In addition, while the contents of the first section are output through the outputter 130, the processor 140 may control the photographing part 110 to operate in a photographing mode. Accordingly, the photographing mode 110 may convert to the photographing mode and photographing an image, and the processor 140 may acquire a user image which is photographed through the photographing part 110 while the contents of the first section are output.

The processor 140 may identify whether the user has completed the first behavior performed in the contents of the first section by analyzing the acquired user image, and if it is identified that the first behavior has been completed, controls the outputter 130 to output the contents of a second section which is the next section of the first section.

Accordingly, the outputter 130 may output the contents of the second section, and when the contents of the second section are output, the processor 140 may perform a series of operations described above and identify whether a second behavior performed in the contents of the second section has been completed.

The processor 140 may identify a section related to each behavior through the following embodiments.

According to an embodiment, the processor 140 may control the electronic apparatus to input an image frame forming an image included in the contents to a trained AI model and acquires a feature value of the input image frame, and performs a scene understanding related to the first behavior based on the acquired feature value. The processor 140 may identify the first section related to the first behavior from a pre-acquired image based on the performed scene understanding.

A more detailed description regarding the AI model for exacting a feature value from the input image frame will be provided below.

The contents include, without limitation, audio data. In this example, the processor 140 may acquire a sentence from audio data included in the contents, identify an object and behavior information by analyzing a constituent element of the acquired sentence, and identify the first section related to the first behavior based on the identification result.

The processor 140 may identify the first section related to the first behavior from the contents.

The processor 140 may input an image frame forming a user image captured through the photographing part 110 to the trained AI model, and acquire a feature value of the input image frame. Subsequently, the processor 140 performs a scene understanding regarding a user behavior included in the user image based on the acquired feature value.

The processor 140 may identify whether a user has completed the first behavior related to the contents of the first section.

If image data is included in the contents, the processor 140 may identify whether the first behavior has been completed using an image of the first section through the following embodiment.

According to an embodiment, the processor may identify whether a user has completed the first behavior by comparing a feature value of an image frame forming a pre-acquired image of the first section and a feature value of an image frame forming the user image.

According to another embodiment, the processor 140 may identify whether a user has completed the first behavior based on a scene understanding regarding an image of the first section, which is performed from a feature value of an image frame forming an image of the first section and a scene understanding regarding the user behavior, which is performed from a feature value of an image frame forming the user image.

According to an additional example aspect of the present disclosure, the processor 140 acquires the first sentence by performing a scene understanding regarding the first behavior included in an image of the first section, and acquires the second sentence by performing a scene understanding regarding a user behavior included in the user image.

For example, the processor 140 may identify an object included in an image frame based on a feature value of a plurality of consecutive image frames forming an image of the first section, and acquire the first sentence representing the first behavior by performing a scene understanding regarding the first behavior included in the first section from a relation with the identified object.

The processor 140 may identify an object included in an image frame based on a feature value of a plurality of consecutive image frames forming a user image which is captured while an image of the first section is reproduced, and acquire the second sentence representing a user behavior by performing a scene understanding regarding a user behavior from a relation with the identified object.

When the first sentence representing the first behavior included in the section and the second sentence representing the user behavior are acquired, the processor 140 control the outputter 130 to display the acquired first and second sentences in an area of the display where an image of the first section is displayed. Accordingly, the outputter 130 displays the first and second sentences on one area of the display where an image of the first section is displayed.

Accordingly, a user may identify whether he or she performs a behavior related to the first behavior included in the image of the first section through the first and second sentences displayed on one area of the screen of the user terminal apparatus 100.

As described above, the method that the first processor 140 acquires the first sentence by performing a scene understanding regarding the first behavior included in the image of the first section and acquires the second sentence by performing a scene understanding regarding a user behavior included in the user image will be described in detail later.

According to an additional aspect of the present disclosure, the processor 140 may identify whether a user performs the first behavior based on a similarity level between the pre-acquired first and second sentences.

For example, the processor 140 may measure a similarity value between the pre-acquired first and second sentences, and if the similarity value is equal to or greater than a predetermined threshold value by comparing the measured similarity value and the predetermined threshold value, identify that the user has performed the first behavior regarding the image of the first section.

If the measured similarity value is less than the predetermined threshold value, the processor 140 may identify that the user has not performed the first value regarding the image of the first section.

In this example, the processor 140 may compare the similarity value and the predetermined threshold value continuously and if it is identified that the measured similarity value is less than the predetermined threshold value for a predetermined threshold value, may identify that the user has not performed the first behavior regarding the image of the first section.

Meanwhile, the contents may include, without limitation, audio data.

In this example, as described above, the processor 140 may acquire a sentence of the first section related to the first behavior from a sentence related to audio data included in the contents.

The processor 140 may identify whether the user has performed the first behavior regarding the first section by comparing the similarity value between the sentence of the first section and the second sentence representing the user behavior which is acquired from the user image captured while the image of the first section is reproduced with the predetermined threshold value.

If it is identified that the first behavior is not performed through the above embodiment, the processor 140 generates a message informing that a behavior different from the first behavior is being performed, and controls the outputter 130 to output the generated message through at least one of an image or audio.

The user may confirm that he or she does not perform the first behavior regarding the first section appropriately through the message output through the electronic apparatus 100.

According to an additional example aspect of the present disclosure, if it is identified that the user has not completed the first behavior regarding the first section, the processor 140 stops the reproduction of the pre-acquired image of repeatedly reproduces the image of the first section.

As described above, the processor 140 may determine whether the user has completed the first behavior regarding the first section by comparing the feature value of the image frame forming the image of the first section with the feature value of the image frame forming the user image.

In addition, the processor 140 may identify whether the user has completed the first behavior regarding the first section based on a scene understanding related to the first behavior regarding the first section and a scene understanding regarding the user behavior.

If it is identified that the user has not completed the first behavior regarding the first section, the processor 140 controls the outputter 130 to stop the reproduction of the image or to repeatedly reproduce the image of the first section. Accordingly, the outputter 130 may stop the reproduction of the image or repeatedly reproduce the image of the first section.

While the reproduction of the image is stopped or the image of the first section is repeatedly reproduced, if a behavior different from the first behavior is performed for a predetermined threshold time, the processor 140 controls the outputter 130 to reproduce the image of the second section.

For example, the processor 140 performs a scene understanding regarding the user behavior by analyzing the user image which is acquired while the reproduction of the image is stopped or the image of the first section is repeatedly reproduced. The processor 140 identifies whether the user performs a behavior different from the first behavior regarding the first section consecutively for more than a predetermined time based on the performed scene understanding. If it is identified that the user has performed a behavior different from the first behavior regarding the first section for more than a predetermined threshold time, the processor 140 controls the outputter 130 to reproduce an image of the second section.

Accordingly, the outputter 130 may reproduce an image of the second section continuously after the image of the first section.

As described above, the contents may include, without limitation, audio data.

In this example, if it is identified that the user has not completed the first behavior regarding the first section, the processor 140 may stop the reproduction of the sentence related to the audio data included in the contents, or control the outputter 130 to output the sentence of the first section continuously.

If it is identified that the first behavior regarding the first section has been completed through the above-described embodiment while the sentence related to the audio included in the contents is stopped or the sentence of the first section is continuously output, the processor 140 may control the outputter 130 to output the sentence of the second section.

Figure 2:
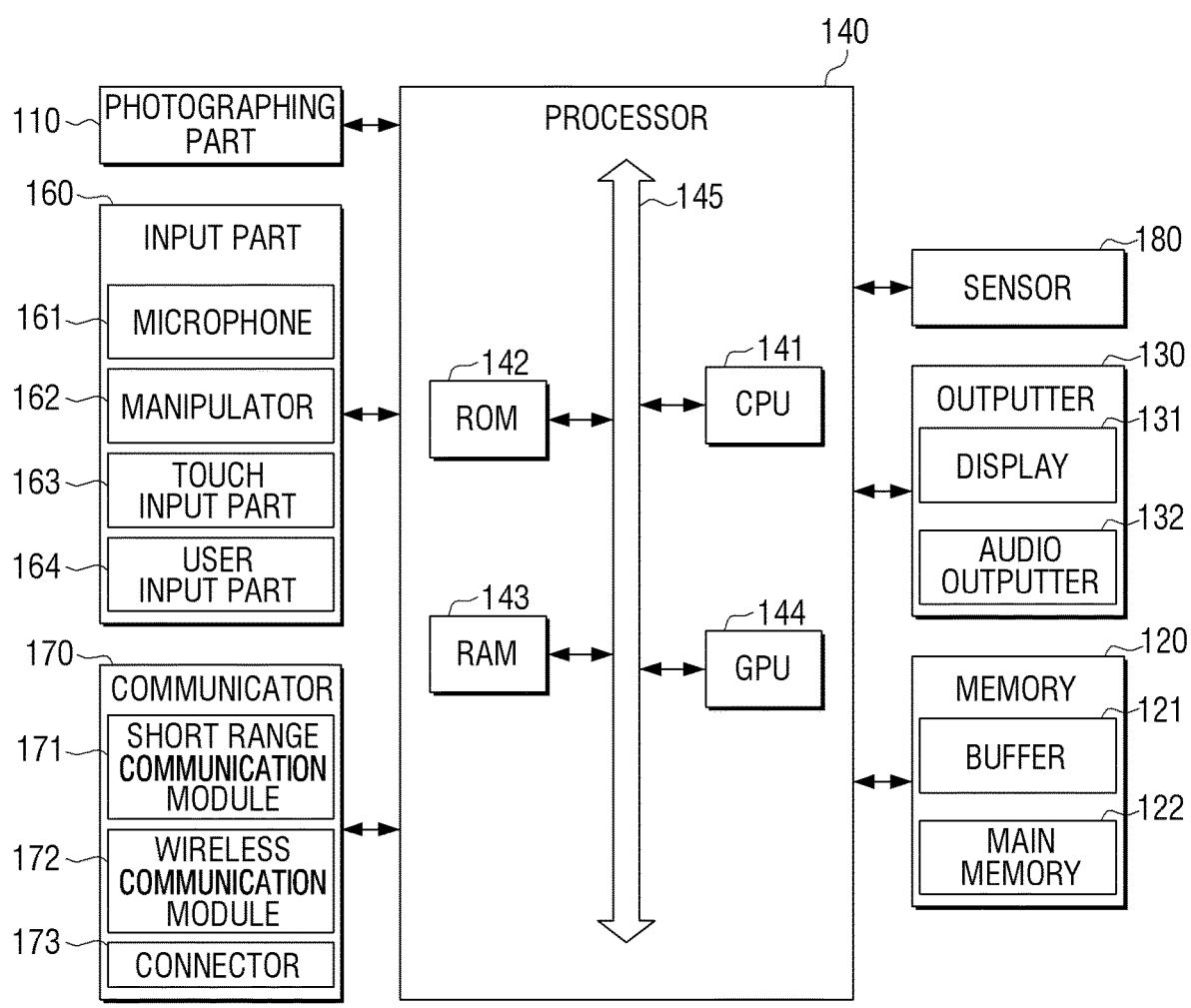
FIG. 2 is a block diagram illustrating an example electronic apparatus according to an embodiment.

The above-described memory 120 may include a buffer 121 and a main memory 122 (see, e.g., FIG. 2). Accordingly, the processor 140 stores acquired contents in the buffer 121, and if the storage capacity of the buffer 121 is insufficient, the remaining image which is not stored in the buffer 121 is stored in the main memory 122.

For example, the buffer 121 temporarily stores data, and may be a volatile memory using the data which is temporarily stored in the buffer 121.

The storage capacity of the buffer 121 may be smaller than the storage capacity of the main memory 122 provided in the electronic apparatus 100. The buffer 121 temporarily stores a plurality of image frames forming image data (hereinafter, referred to as an image) included in the contents received from the outside in a predetermined part. Subsequently, when an image frame of a certain part is reproduced, the buffer 121 temporarily store image frames of a predetermined part afterwards while the corresponding image frame is reproduced.

As described above, if there is an event where the user has not completed the first behavior regarding the first section and thus, the reproduction of the image is stopped or the image of the first section is repeatedly reproduced, the processor 140 checks the available storage capacity of the buffer 121 which stores images while the corresponding event occurs. Upon checking, if it is identified that there is no available storage capacity, the processor 140 stores the remaining images which are not stored in the buffer 121 in the main memory 122.

If the user has completed the first behavior regarding the first section and an image of the second section is reproduced, the buffer 121 may temporarily store the remaining images stored in the main memory 122.

FIG. 2 is a block diagram illustrating an example electronic apparatus according to an embodiment.

As described above, the electronic apparatus 100 may include various smart devices, such as, for example, and without limitation, a smart TV, smart phone, tablet PC, or the like. The electronic apparatus 100 may further include an input part (e.g., including input circuitry) 160, a communicator (e.g., including communication circuitry) 170, and a sensor 180 in addition to the above-described photographing part (e.g., including image capturing circuitry) 110, the memory 120, the outputter (e.g., including output circuitry) 130 and the processor (e.g., including processing circuitry) 140.

As mentioned above, the memory 120 may include the buffer 121 and the main memory 122.

The buffer 121 temporarily stores contents. The main memory 122 may store an operating program to control various contents and the operations of the electronic apparatus 100. The memory including the buffer 121 and the main memory 122 may be implemented using, for example, and without limitation, at least one of a memory card (e.g., an SD card and a memory stick) which can be mounted in or dismounted from a read only memory (ROM), a random access memory (RAM), or the electronic apparatus 100, a non-volatile memory, a volatile memory, a hard disk drive (HDD), a solid state drive (SSD), or the like.

The input part 160 may include various input circuitry and receives a user command. The input part 160 may include various input circuitry, such as, for example, and without limitation, a microphone 161, a manipulator 162, a touch input part 163, a user input part 164, or the like.

The microphone 161 may receive the voice command of the user and the manipulator 162 may be implemented, for example, and without limitation, as a key pad including various function keys, numeric keys, special keys, character keys, or the like.

If a display 131 which will be described below is implemented in the form of a touch screen, the touch input part 163 may be implemented, for example, and without limitation, as a touch pad which has a inter-layered structure with respect to the display 131. In this example, the touch input part 163 may receive a command to select an icon regarding various applications displayed through the display 131.

The user input part 164 user input 164 may include various input circuitry and receive an IR signal or an RF signal for controlling the operation of the electronic apparatus 100 from at least one peripheral device (not illustrated) like a remote control device.

The communicator 170 may include various communication circuitry and performs data communication with a peripheral device (not illustrated) such as a smart TV, a smart phone, a tablet PC, etc., a content server (not illustrated), and the like. For example, if an AI model is stored in a separate AI server (not illustrated), the communicator 170 may receive a feature value for each of the above-descried image and the user image from the AI server (not illustrated).

The communicator 170 may include various modules including various communication circuitry, such as, for example, and without limitation, a short range communication module 171, a wireless communication module 172 such as a wireless local access network (LAN) module, and a connector 173 including at least one of wired communication modules such as, for example, and without limitation, a high-definition multimedia interface (HDMI), a universal serial bus (USB), Institute of Electrical and Electronics Engineers (IEEE) 1394, or the like.

The short range module 171 may include various short range communication circuitry and performs near field communication wirelessly with a peripheral device near the electronic apparatus 100, an AI server (not illustrated) and the like. The short range communication module 171 may include, for example, and without limitation, at least one of a Bluetooth module, an infrared data association (IrDA) module, a Near Field Communication (NFC) module, a WiFi module, a Zigbee module, etc.

The wireless communication module 172 may be a module that is connected to an external network according to a wireless communication protocol such as IEEE to perform communications. In addition, the wireless communication module may further include a mobile communication module which is connected to a mobile communication network according to various mobile communication standards such as 3rd generation (3G), 3rd generation partnership project (3GPP), and long term evolution (LTE) to perform communications.

The communicator 170 may be implemented by the above-mentioned various short range communication schemes and may employ other communication technologies not mentioned in the present disclosure, as needed.

The connector 173 may include various communication circuitry and provides an interface with various source devices such as USB 2.0, USB 3.0, HDMI, IEEE 1394, etc. The connector 173 may receive image-related data transmitted from a content server (not illustrated) via a cable connected to the connector 173 according to a control command of the processor 140 or may transmit pre-stored image to an external recording medium. In addition, the connector 173 may receive power from a power source via cable physically connected to the connector 173.

The sensor 180 senses a motion of the electronic apparatus 100. The sensor 180 may include, for example, and without limitation, an accelerometer sensor, a magnetic sensor, a gyroscope sensor, or the like, and a motion of the electronic apparatus 100 may be sensed using such various sensors.

The accelerometer sensor is a sensor measuring an acceleration or an impact strength of the electronic apparatus 100, and is a sensor that is used for various transport means such as a vehicle, a train, and an airplane and control systems such as a robot as well as electronic devices such as a smart phone and a tablet PC.

The magnetic sensor may be an electronic compass that may detect an azimuth using an earth's magnetic field, and is a sensor that is used for positioning, three dimensional (3D) video game, or the like or used for a smart phone, a radio set, GPS, personal digital assistant (PDA), a navigation device or the like.

The gyroscope sensor may be a sensor that adds a rotation function to the existing accelerometer sensors to recognize a 6-axis direction to thereby help recognize a more elaborate and precise operation.

The above-described outputter 130 may include the display 131 and the audio outputter (e.g., including audio output circuitry) 132.

The display 131 outputs image data which is signal-processed by an image processor (not illustrated). In addition, the display 131 may display an execution screen including an icon to execute each of a plurality of applications stored in the memory 150 or display various UI screens to control the operations of the electronic apparatus 100.

The display 131 may be implemented with, for example, and without limitation, a liquid crystal display (LCD), an organic light emitting diode (OLED), or the like.

In addition, the display 131 may be implemented in a form of a flexible display form and may be connected to at least one of a front area, a side area, and a rear area of the electronic apparatus 100.

The flexible display may have characteristics that it can be bent, curved, or rolled without being damaged as its substrate is thin and flexible. The flexible display may be manufactured using a plastic substrate as well as a glass substrate which is generally used. When the plastic substrate is used, a low temperature manufacturing process may be used instead of an existing manufacturing process to avoid damage on the substrate. Also, a glass substrate enclosing a flexible liquid crystal may be replaced with a plastic film so as to give flexibility enabling folding and unfolding. Such a flexible display may be thin, light and even resistant to an impact or a shock, and can be twisted or bended. The flexible display also may be embodied in various forms.

The audio outputter 132 may include various audio output circuitry and outputs image-related audio data. For example, the audio outputter 132 may output various kinds of alarm sounds or voice messages in addition to various audio data on which various processing operations such as decoding, amplification, and noise filtering are performed by an audio processor (not illustrated). For example, the audio outputter 132 may be implemented to be a speaker; this is merely one of various example embodiments of the present disclosure. The audio outputter 132 may be implemented to be output component that can output the audio data.

The above-described processor 140 may include various processing circuitry and controls the overall operations of the electronic apparatus 100, or may be a processing device which is configured to control the overall operations of the electronic apparatus 100.

The processor 140 may include a CPU 141, a ROM 142, a RAM 143, and a GPU 144, and the CPU 141, the ROM 142, the RAM 143, and the GPU 144 may be connected through a bus 145.

The CPU 141 accesses the memory 150 and performs booting by using OS stored in the memory 150. Further, the CPU 141 performs various operations using various kinds of programs, content, and data stored in the storage 150.

The GPU generates a display screen including various objects such as icons, images, texts, etc. For example, the GPU calculates attribute values such as a coordinate value, a shape, a size and a color of each object to be displayed according to the layout of the screen based on the received control command, and generates a display screen of various layouts including the objects based on the calculated attribute values.

The ROM 142 stores a set of commands for system booting. When a turn-on command is input and thus the electric power is supplied, the CPU 141 copies the stored O/S in the memory 150 to RAM 143 according to the commands stored in ROM 142, and boots the system by executing O/S. When the booting is completed, the CPU 141 copies the various programs stored in the memory 150 to the RAM 143, and performs various operations by implementing the programs copied to the RAM 143.

The processor 140 may be implemented by a system-on-a chip (SOC) or a system on chip (Soc) by being combined with the above-described various components.

Figure 3:
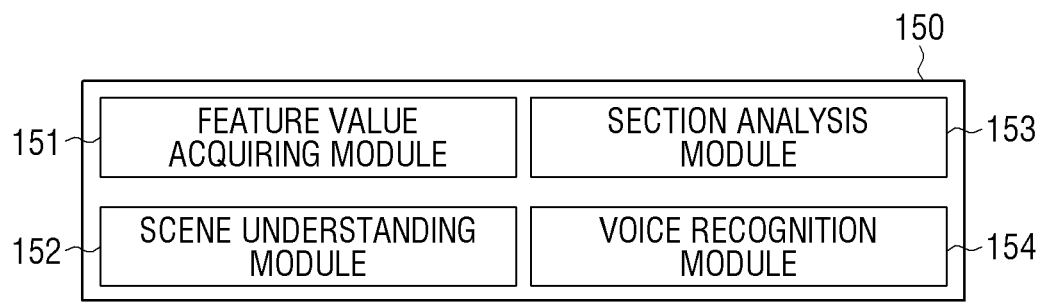
FIG. 3 is a block diagram illustrating a memory that stores various modules for automatically reproducing an image included in contents according to a user behavior according to an embodiment.

FIG. 3 is a block diagram illustrating an example memory that stores various modules for automatically reproducing an image included in contents according to a user behavior according to an embodiment.

As illustrated in FIG. 3, the memory 150 may include, for example, and without limitation, a feature value acquiring module 151, a scene understanding module 152, a section analysis module 153, a sentence generating module 154, and a voice recognition module 155. Each of the foregoing modules may include various processing circuitry and/or executable program elements.

The feature value acquiring module 151 is a module that may include various processing circuitry and/or executable program elements and acquires a feature value of an input image frame by inputting an image frame temporarily stored in the memory 120 from among a plurality of image frames forming an image to a trained AI module.

If a feature value for each image frame is acquired through the feature value acquiring module 151, an object included in the image frame input to the AI module can be identified based on the acquired feature value.

The scene understanding module 152 may include various processing circuitry and/or executable program elements and performs a scene understanding related to each behavior based on the acquired feature value. Specifically, the scene understanding module 152 acquires image information for each image frame based on the acquired feature value. The image information may include object information, color information, location information regarding an object, etc. The scene understanding module 152 acquires movement information regarding a pre-defined specific object from among object information included in the image information regarding each image frame based on the acquired feature value. Here, the pre-defined specific object may be a representative object from among objects included in each image frame.

The scene understanding module 152 may include various processing circuitry and/or executable program elements and performs a scene understanding related to each behavior based on the image information acquired based on the feature value and the movement information regarding an object.

The scene understanding module 152 generates a sentence related to each behavior based on the scene understanding which is performed in relation to each behavior.

According to an embodiment, the scene understanding module 152 may generate a sentence related to each behavior using, for example, and without limitation, a Recurrent Neural network (RNN) model of a Long Short-term Memory (LSTM) scheme.

The Recurrent Neural network (RNN) model of the Long Short-term Memory (LSTM) scheme may, for example, be a model for inputting a long-term stored data and short-term stored data and outputting the resultant value.

The scene understanding module 152 may generate a sentence related to each behavior by inputting image information acquired from each of a plurality of image frames and movement information regarding a specific object to the RNN model of the LSTM scheme.

The section analysis module 153 may include various processing circuitry and/or executable program elements and identifies a section related to each behavior based on the scene understanding which is performed through the scene understanding module 152.

For instance, if a feature value is acquired from a plurality of image frames forming an image related to the image of cooking food A, the scene understanding module 152 performs a scene understanding for each cooking step (each behavior) for cooking food A based on the acquired feature value. Subsequently, the section analysis module 153 classifies image frames related to each cooking step as the images of the same section based on the scene understanding for each cooking step (each behavior) for cooking food A which has been performed through the scene understanding module 152.

When a user voice is input through the input part 160, the voice recognition module 154 converts the input user voice to a language which can be recognized by the electronic apparatus 100.

If a user voice is input, the voice recognition module 154 converts the input user voice to a text using a Speech to Text (STT) algorithm, and identifies the user's utterance intention by analyzing the user voice which has been converted to the text.

If a text regarding a user voice is acquired through the above voice recognition module 154, the scene understanding module 152 may generate a sentence related to each behavior by inputting the image information acquired from each of a plurality of image frames, the movement information of a specific object, and the text regarding the user voice through the voice recognition module 154 as described above.

An example controlling method of the electronic apparatus 100 to automatically reproduce an image based on a user behavior according to an embodiment will be described in greater detail below.

Figure 4:
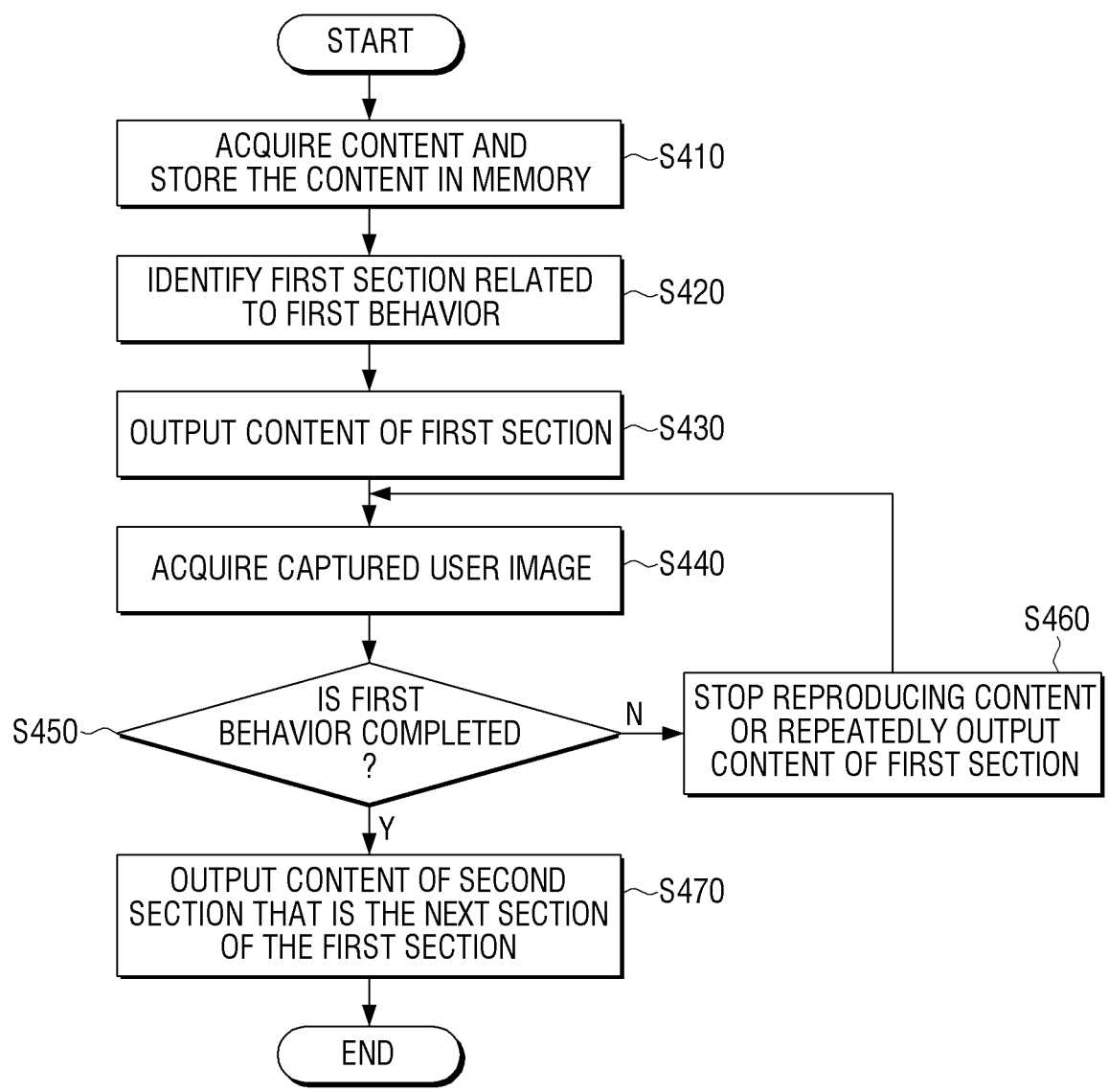
FIG. 4 is a flowchart illustrating an example method for automatically outputting contents based on a user behavior in an electronic apparatus according to an embodiment.

FIG. 4 is a flowchart illustrating an example method for automatically outputting contents based on a user behavior in an electronic apparatus according to an embodiment.

As illustrated in FIG. 4, when contents received from outside are input, the electronic apparatus 100 acquires the input contents and temporarily stores the contents in the memory 120 (S410).

The contents may include at least one of image data, audio data and texts.

The electronic apparatus 100 identifies the first section related to the first behavior by analyzing the stored contents, and outputs the contents of the identified first section (S420, S430). The electronic apparatus 100 acquires a user image captured while the contents of the first section are output (S440).

However, the present disclosure is not limited to the above embodiment, and the electronic apparatus 100 may receive a user voice through the input part 160 while the contents of the first section are output, and acquire texts which are converted from the input user voice through the above-described embodiment.

The contents of the first section may be contents of the first section, and when the contents of such the first section are output, the electronic apparatus 100 may acquire a user image captured through the following embodiment.

According to an embodiment, when the output of the contents of the first section starts, the electronic apparatus 200 may activate a camera (not illustrated) to photograph a surrounding environment including the user and acquire the user image including the user through the activated camera (not illustrated).

According to another embodiment, when the output of the contents of the first section starts, and a pre-defined user motion is sensed through the sensor 180, the electronic apparatus 100 may activate a camera (not illustrated) to photograph a surrounding environment including the user and acquire the user image including the user through the activated camera (not illustrated).

If the user image which is photographed while the contents of the first section are output is acquired through the above embodiment, the electronic apparatus 100 analyzes the acquired user image and identifies whether the user has completed the first behavior related to the contents of the first section (S450).

If it is identified that the user has not completed the first behavior related to the contents of the first section, the electronic apparatus 100 may stop outputting the contents or repeatedly output the contents of the first section until the user has completed the first behavior (S460).

If it is identified that the user has completed the first behavior related to the contents of the first section, the electronic apparatus 100 outputs the contents of the second section which is the next section of the first section (S470).

The electronic apparatus 100 identifies whether the user has completed the second behavior related to the contents of the second section by performing the above-described steps S440 and S450 and analyzing the user image which is photographed while the contents of the second section are output.

If it is identified that the user has not completed the second behavior related to the contents of the second section, the electronic apparatus 100 may stop the reproduction of the contents through the above-described step S460 or repeatedly output the contents of the second section until the user has completed the first behavior.

If it is identified that the user has completed the second behavior related to the contents of the second section, the electronic apparatus 100 determines whether there are section contents after the second section and if so, repeatedly performs the operations of the above-described steps of S440 to S470, and if there are not section contents after the second section, terminates the operation of the automatic output of contents according to the user behavior.

An example method of identifying a section image for each behavior from image data included in the contents and acquiring the photographed user image in the electronic apparatus 100 in described in greater detail below.

Figure 5:
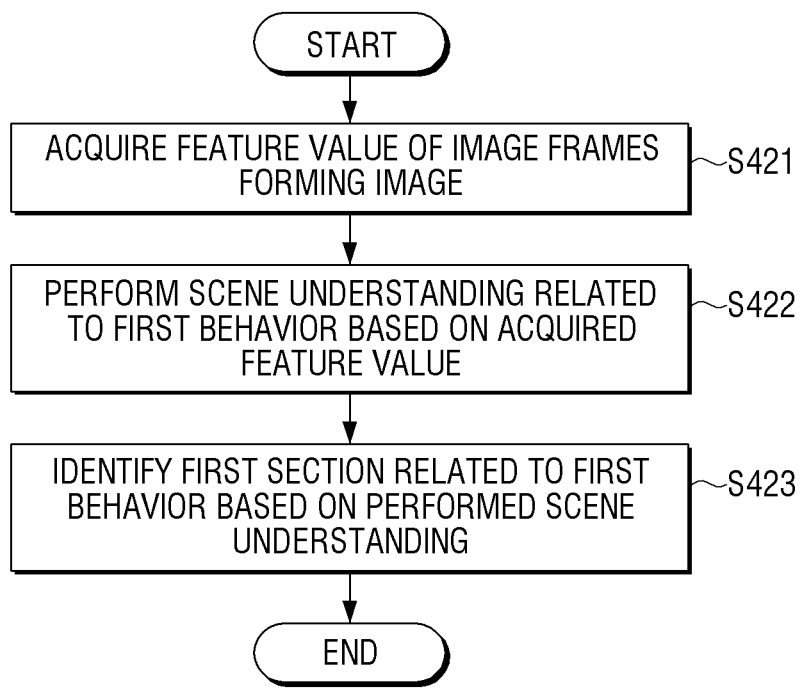
FIG. 5 is a flowchart illustrating an example of identifying a section image for each behavior from an image included in contents in an electronic apparatus according to an embodiment.

FIG. 5 is a flowchart illustrating an example of identifying a section image for each behavior from an image included in contents in an electronic apparatus according to an embodiment.

The contents received from outside may include image data. In this example, the electronic apparatus 100 temporarily stores a plurality of image frames forming image data (hereinafter, referred to as an image) included in the contents received from outside in the memory 120. For example, the plurality of image frames temporarily stored in the memory 120 may be consecutive partial image frames among all image frames forming the image.

If the consecutive image frames are stored in the memory 120, as illustrated in FIG. 5, the electronic apparatus 100 input the plurality of image frames which are temporarily stored in the memory 120 to an AI model and acquire a feature value regarding each of the plurality of image frames (S421).

For example, the feature value of each of the plurality of image frames may be information to identify an object included in each of the plurality of image frames.

If the feature value regarding each of the plurality of image frames is acquired, the electronic apparatus 100 performs a scene understanding regarding the first behavior based on each of the acquired feature value (S422).

The electronic apparatus 100 identifies the first section related to the first behavior based on the scene understanding which has been performed with respect to the first behavior (S423).

For example, the electronic apparatus 100 may perform a scene understanding related to the first behavior from a plurality of image frames based on the image information regarding each of the plurality of image frames and the movement information of a specific object which has been acquired based on the feature value of each of the plurality of image frames using the above-described scene understanding module 152.

The electronic apparatus 100 may identify an image frame related to the first behavior among a plurality of image frames as an image frame of the first section based on the scene understanding which has been performed regarding the first behavior.

Figure 6:
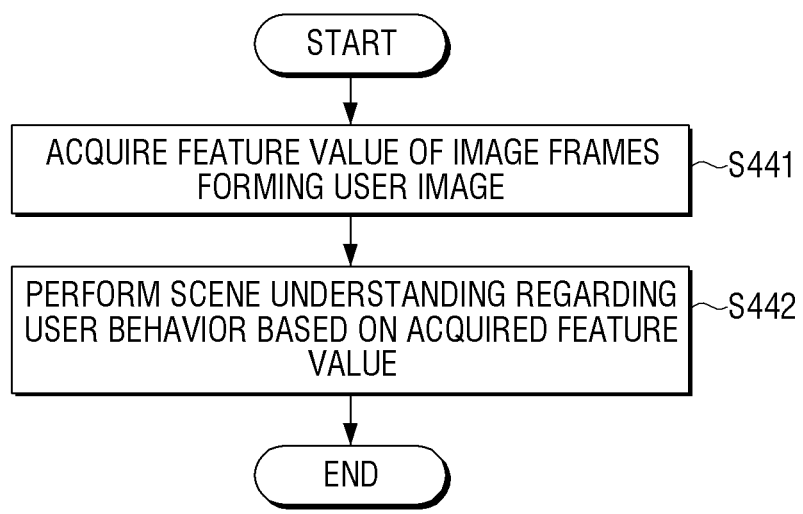
FIG. 6 is a flowchart illustrating an example method for acquiring a user image captured by an electronic apparatus according to an embodiment.

FIG. 6 is a flowchart illustrating an example method for acquiring a user image captured by an electronic apparatus according to an embodiment.

As illustrated in FIG. 6, if the user image captured through a camera (not illustrated) is acquired while an image of the first section is reproduced, the electronic apparatus 100 inputs a plurality of image frames forming the acquired user image to an AI model and acquires a feature value of the plurality of image frames input to the AI model (S441).

For example, the feature value of each of the plurality of image frames may be information for identifying an object included in each of the plurality of image frames.

Once the feature value of the plurality of image frames is acquired, the electronic apparatus 100 performs a scene understanding regarding a user behavior from the pre-acquired user image based on each acquired feature value (S422).

As described above, the electronic apparatus 100 may activate a camera (not illustrated) while an image of the first section related to the first behavior is reproduced, and acquired the user image which is captured through the activated camera (not illustrated).

However, the present disclose is not limited to the above embodiment, and if a pre-defined user motion is sensed through the sensor 180, the electronic apparatus 100 may activate a camera (not illustrated) and acquire the user image captured through the activated camera (not illustrated).

For example, if the image of the first section related to the first behavior is an image of the start section from among a plurality of section images divided from the entire image and if a pre-defined user motion is sensed through the sensor 180, the electronic apparatus 100 may activate a camera (not illustrated) and acquire the user image captured through the activated camera (not illustrated).

According to another embodiment, if a pre-defined user motion is sensed through the sensor 180, the electronic apparatus 100 reproduces an image of each section. In other words, if a pre-defined user motion is sensed, the electronic apparatus 100 reproduces an image of the first section which is the start section from among a plurality of sections, and when the reproduction of the image of the first section ends, the electronic apparatus 100 may reproduce an image of the second section which is the next section of the first section according to whether a pre-defined user motion is sensed.

While the image of each section is reproduced, the electronic apparatus may activate a camera (not illustrated), and acquire the user image captured through the activated camera (not illustrated).

If the user image captured through the camera (not illustrated) while the image of the first section is reproduced, the electronic apparatus 100 may acquire a feature value regarding an object forming a plurality of image frames by inputting the plurality of image frames forming the acquired user image to an AI model.

If a feature value regarding an object forming a plurality of image frames with respect to the user image is acquired, the electronic apparatus 100 may perform a scene understanding regarding a user behavior from the user image based on the image information regarding each of the plurality of image frames which is acquired based on a feature value regarding the plurality of image frames using the above-described scene understanding module 152 and the movement information of a specific object.

When the reproduction of the image of the first section regarding the first behavior is terminated, the electronic apparatus 100 may analyze the user image captured while the image of the first section is reproduced and identify whether the user has completed the first behavior regarding the first section.

According to an embodiment, if it is identified that the image of the first section regarding the first behavior, which is being reproduced, is the image of the ending point, the electronic apparatus 100 acquires a feature value (hereinafter, referred to as the first feature value) of the image frame forming the image of the ending point among the plurality of image frames forming the image of the first section and a feature value (hereinafter, referred to as the second feature value) of the image frame forming the user image captured before and after the ending point of the image of the first section being reproduced. Subsequently, the electronic apparatus 100 compares the acquired first and second feature values to identify whether the user has completed the first behavior related to the image of the first section.

According to another embodiment, if it is identified that that the image of the first section regarding the first behavior, which is being reproduced, is the image of the ending point, the electronic apparatus 100 may identify whether the user has completed the first behavior related to the image of the first section based on the scene understanding performed using the feature value of the image frame forming the image of the ending point among the plurality of image frames forming the image of the first section and the scene understanding performed using the feature value of the image frame forming the user image captured before and after the ending point of the image of the first section being reproduced.

Through the above embodiment, if it is identified that the user has completed the first behavior related to the image of the first section, the electronic apparatus 100 may reproduce the image of the second section which is the next section of the first section.

When the image of the second section is reproduced, the electronic apparatus 100 may identify whether the user has completed the second behavior related to the image of the second section from the user image captured while the image of the second section is reproduced by performing the above-described operations.

If it is identified that the first behavior related to the image of the first section has not been completed, the electronic apparatus 100 may stop the reproduction of the image or repeatedly reproduce the image of the first section until the user has completed the first behavior.

While the image of the first section related to the first behavior is reproduced, the electronic apparatus 100 may analyze the user image captured while the image of the first section is reproduced, the electronic apparatus 100 may identify whether the user normally performs the first behavior regarding the first section.

According to an embodiment, while the image of the first section related to the first behavior is reproduced, the electronic apparatus 100 generates a sentence related to the first behavior based on the scene understanding which is performed using the feature value acquired from a plurality of image frames forming the image of the first section.

The electronic apparatus 100 generates a sentence related to the user behavior based on the scene understanding which is performed using the feature value acquired from a plurality of image frames forming the user image captured while the image of the first section is reproduced.

The electronic apparatus 100 compares a similarity between the generated sentence related to the first behavior regarding the image of the first section and the sentence related to the user behavior. If the similarity of the two sentences is equal to or greater than a threshold value, the electronic apparatus 100 identifies that the user is performing the first behavior related to the first section.

If the similarity of the two sentences is less than a threshold value, the electronic apparatus 100 identifies that the user is not performing the first behavior related to the first section.

If it is identified that the first behavior has not been completed, the electronic apparatus 100 may output a message informing that a behavior different from the first behavior has been performed through one of an image and audio.

An example method of automatically reproducing an image according to a user behavior in the electronic apparatus 100 according to an embodiment has been described in detail. The operation of identifying whether a user performs a behavior of a section image separated from an image in the electronic apparatus 100 according to an embodiment will be described in greater detail below.

Figure 7:
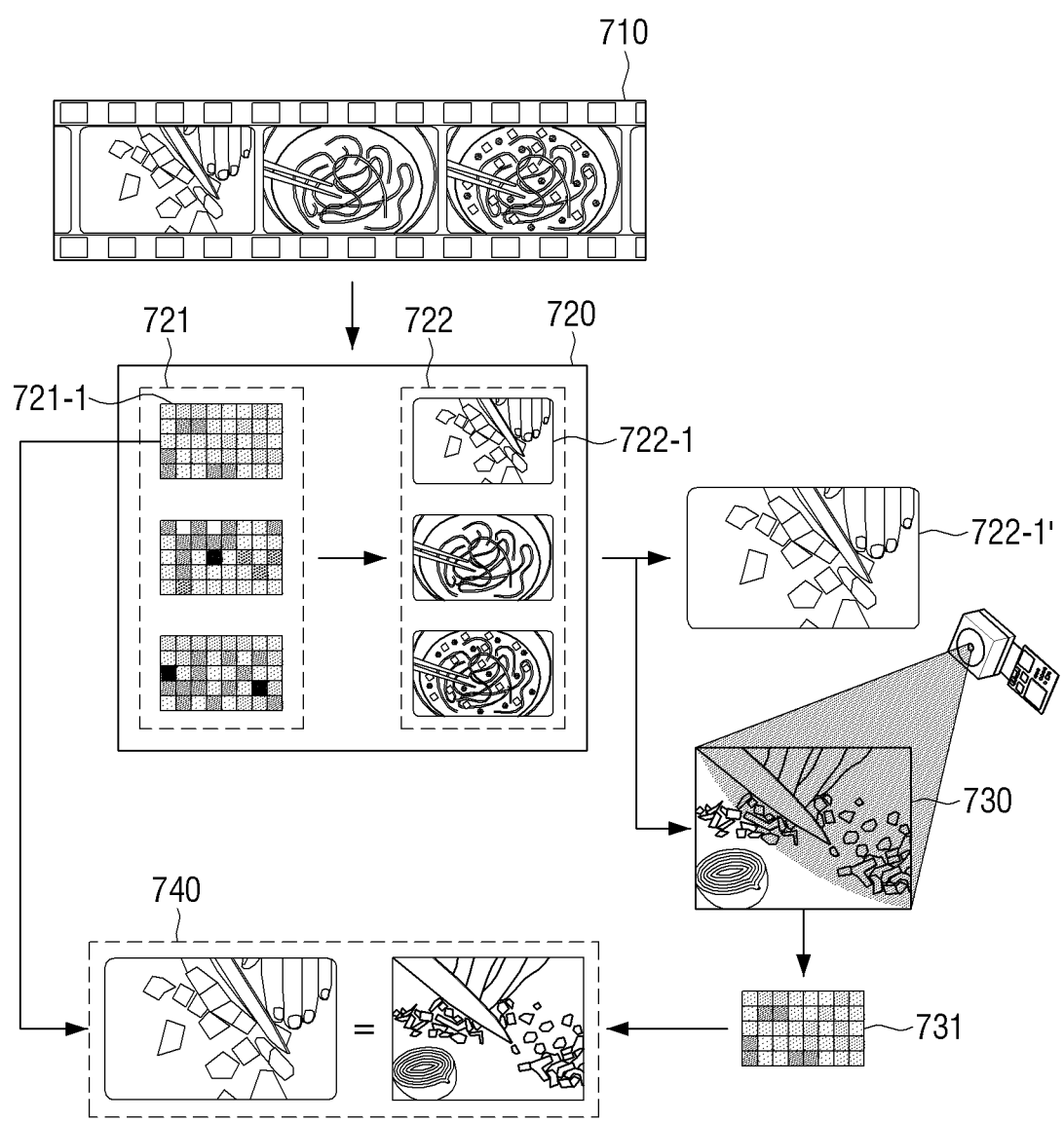
FIG. 7 is a diagram illustrating an example of identifying whether a user behavior is a behavior of a section image in an electronic apparatus according to an embodiment.

FIG. 7 is diagram illustrating an example of identifying whether a user behavior is a behavior of a section image in an electronic apparatus according to an embodiment.

As illustrated in FIG. 7, the electronic apparatus 100 may receive a streaming image 710 requested by a user through a content server (not illustrated) that provides an image. For instance, upon a user's request, the electronic apparatus 100 may receive the streaming image 710 related to a Chinese cooking.

Once such an image 710 is received, the electronic apparatus 100 may temporarily store a plurality of image frames forming the received image 710 sequentially in the memory 120.

If the plurality of image frames forming the image are temporarily stored in the memory 120, the electronic apparatus 100 analyzes the plurality of image frames which are temporarily stored in the memory 120 and identifies a section 720 for each cooking stage (behavior) of the Chinese cooking requested by the user.

Specifically, the electronic apparatus 100 inputs the plurality of image frames which are temporarily stored in the memory 120 to a trained AI model, and acquire a feature value 721 of the plurality of input image frames. Subsequently, the electronic apparatus 100 performs a scene understanding for each cooking stage (behavior) of the Chinese cooking requested by the user based on the feature value 721 of the plurality of image frames.

The electronic apparatus 100 identifies a section 722 for the image reproduction for each cooking stage (behavior) based on the scene understanding performed for each cooking stage (behavior) of the Chinese cooking requested by the user.

When the section 722 for image reproduction for each cooking stage (behavior) is identified, the electronic apparatus 100 selects the first section 722-1 which is a start section of the Chinese cooking requested by the user, and reproduces the image (722-1') of the selected first section.

When the reproduction of the image 722-1' of the first section starts, the electronic apparatus 100 acquires a user image 730 by photographing a user around a camera (not illustrated) using the camera (not illustrated). If the user image 730 captured through the camera is acquired while the image 722-1' of the first section is reproduced, the electronic apparatus 100 inputs the image frames forming the acquired user image 730 to a trained AI model, and acquires a feature value 731 of the input image frames.

The electronic apparatus compares the feature value 721-1 which is acquired regarding the image 722-1' of the first section and the feature value 731 which is acquired regarding the user image captured while the image 722-1' of the first section is reproduced.

According to the similarity between the two feature values 721-1, 731, the electronic apparatus 100 identifies whether the user has performed the operation of preparing cooking ingredients (behavior) related to the image 722-1' of the first section.

For example, the image 722-1' of the first section may be an image regarding the step of preparation of cooking material (behavior) 740 for preparing and trimming cooking material.

Accordingly, the electronic apparatus 100 may compare two features values 721-1, 731 and identify whether the user has completed the material preparation step (behavior) (740) for preparing and trimming cooking material.

If it is identified that the two feature values 721-1, 731 are similar, the electronic apparatus 100 may identify that the user has completed the material preparation step (behavior) 740 for preparing and trimming cooking material, and reproduce the image of the second section which is the next section of the image 722-1' of the first section.

For example, the image of the second section is related to the cooking step (behavior) next to the material preparation step of preparing and trimming cooking material.

If the two feature values 721-1, 731 are not similar, the electronic apparatus 100 may identify that the user has not completed the cooking material preparation step (behavior) 740, and may stop the reproduction of the image regarding the Chinese cooking until the user has completed the step of preparing and trimming the cooking material 740 or may repeatedly reproduce the image 722-1' of the first section.

Figure 8A:
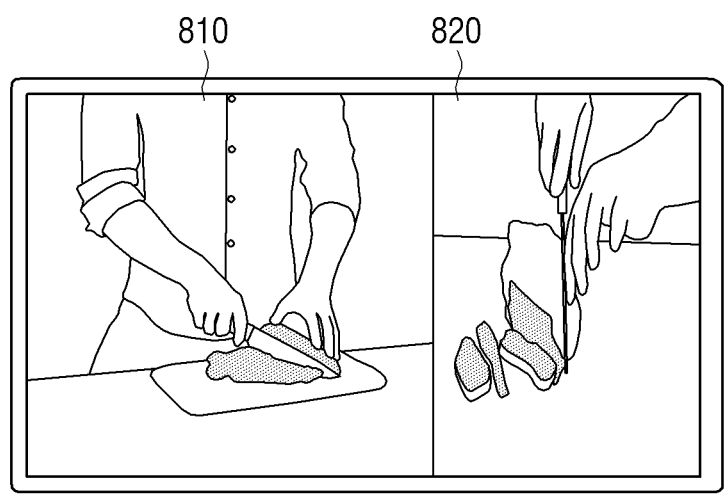
FIG. 8A is a diagram illustrating an example of automatically reproducing an image according to a user behavior in an electronic apparatus according to an embodiment.
Figure 8B:
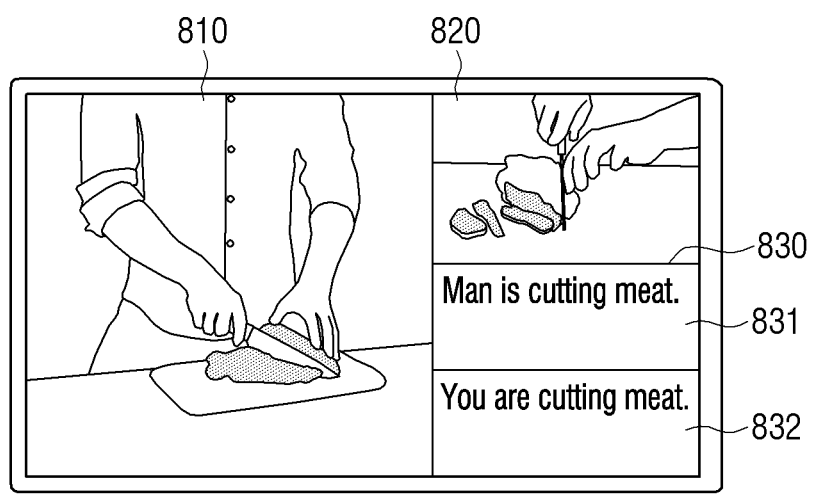
FIG. 8B is a diagram illustrating an example of automatically reproducing an image according to a user behavior in an electronic apparatus according to an embodiment.

FIG. 8A is a diagram illustrating an example where an image is reproduced automatically according to a user behavior in an electronic apparatus according to an embodiment, FIG. 8B is a diagram illustrating an example where an image is reproduced automatically according to a user behavior in an electronic apparatus according to an embodiment, FIG. 8C is a diagram illustrating an example where an image is reproduced automatically according to a user behavior in an electronic apparatus according to an embodiment, and FIG. 8D is a diagram illustrating an example where an image is reproduced automatically according to a user behavior in an electronic apparatus according to an embodiment.

Once an image related to a dish that a user requests is received from a content server (not illustrated), the electronic apparatus 100 identifies a section related to each behavior by analyzing the received image related to the cooking.

As illustrated in FIG. 8A, the electronic apparatus 100 reproduces an image 810 of the first section related to the first behavior which is the initial start section among pre-identified sections for behavior.

For instance, if the first behavior is a behavior related to the preparing of cooking material for the dish the user requested, the electronic apparatus 100 may display the image 810 of the first section related to the behavior of preparing cooking material among images on the screen.

Once the reproduction of the image 810 of the first section is initiated, the electronic apparatus photographs a user image 820 including the user located around the camera (not illustrated) through the camera (not illustrated).

The electronic apparatus 100 displays the image 810 of the first section on the first area, and the user image 820 captured while the image 810 of the first section is displayed, on the second area which is different from the first area where the image 810 of the first section is displayed.

Accordingly, the user may monitor the user image 820 displayed on the second area of the screen and identify whether he or she appropriately performs the behavior of preparing the cooking material related to the image 810 of the first section.

In addition, as mentioned above, the electronic apparatus 100 displays the image 810 of the first section on the first area, and displays the user image 820 captured while the image 810 of the first section is displayed, on the second area which is different from the first area where the image 810 of the first section is displayed.

In this example, the electronic apparatus 100 may display a sentence 830 which is generated to correspond to each of the image 810 of the first section and the user image 820 on the third area which is different from the first and the second areas where the image 810 of the first section and the user image 820 are displayed, respectively.

For example, as described above, the electronic apparatus 100 performs a scene understanding regarding the behavior of preparing cooking material related to the image 810 of the first section. Subsequently, the electronic apparatus 100 generates a first sentence 831 related to the behavior of preparing the cooking material based on the performed scene understanding and displays the generated first sentence 831 on the third area of the screen.

In addition, as described above, the electronic apparatus 100 performs a scene understanding regarding a user behavior related to the user image 820 which is captured while the image 810 of the first section is displayed. Subsequently, the electronic apparatus 100 generates a second sentence 832 related to the user behavior based on the performed scene understanding and displays the generated second sentence 832 on the third area 830.

Accordingly, the user may identify whether he or she appropriately performs the behavior of preparing the cooking material related to the image 810 of the first section by monitoring the user image 820 displayed on the second area or through the sentence 830 displayed on the third area of the screen.

If the image 810 of the first section has ended, the electronic apparatus identifies whether the user has completed the behavior of preparing the cooking material by analyzing the user image which is captured at the time when the image 810 of the first section is ended.

If it is identified that the user has not completed the behavior of preparing the cooking material, the electronic apparatus 100 stops the reproduction of the image related to the cooking requested by the user as illustrated in (a) of FIG. 8C.

In other words, if it is identified that the user has not completed the behavior of preparing the cooking material, the electronic apparatus 100 may display the image 810-1 which is the image at the time when the image 810 of the first section is ended on the first area, and display the user image 820-1 captured while the image 810-1 at the time when the image 810 of the first section is ended on the second area of the screen.

If it is identified that the user has not completed the behavior of preparing the cooking material, the electronic apparatus 100 repeatedly reproduces the image of the first section as illustrated in (b) of FIG. 8C.

In other words, if it is identified that the user has not completed the behavior of preparing the cooking material, the electronic apparatus 100 may repeatedly reproduce the image 810 of the first section on the first area repeatedly, and display the user image 820-1 captured while the image 810 of the first section is repeatedly displayed on the first area, on the second area of the screen.

Meanwhile, as illustrated in (a) of FIG. 8D, the electronic apparatus 100 may display the image 810-1 at the time when the image 810 of the first section is ended on the first area of the screen, and display the user image 820-2 captured while the image 810-1 at the time when the image 810 of the first section is ended is displayed, on the second area of the screen.

For example, the user image 820-2 displayed on the second area may be an image having a similar feature value to the image 810-1 at the time when the image 810 of the first section is ended.

In this case, the electronic apparatus 100 identifies that the user's behavior regarding the preparation of the cooking material has completed. The electronic apparatus 100 displays the image 840 of the second section to be reproduced after the image 810 of the first section on the first area and display the image 850 captured while the image 840 of the second section is reproduced on the second area as illustrated in (b) of FIG. 8D.

In this example, the electronic apparatus 100 may display a sentence 860 which is generated to correspond to each of the image 840 of the second section and the user image 850 on the third area which is different from the first and the second areas where the image 840 of the second section and the user image 850 are displayed, respectively.

For example, as described above, the electronic apparatus 100 performs a scene understanding regarding the behavior of cooking material related to the image 840 of the second section. Subsequently, the electronic apparatus 100 generates a first sentence 861 related to the behavior of cooking the material based on the performed scene understanding and displays the generated first sentence 861 on the third area of the screen.

In addition, as described above, the electronic apparatus 100 performs a scene understanding regarding a user behavior related to the user image 850 which is captured while the image 840 of the second section is displayed. The electronic apparatus 100 generates a second sentence 862 related to the user behavior based on the performed scene understanding and displays the generated second sentence 862 on the third area of the screen.

An example operation of performing a scene understanding by analyzing an image acquired from the electronic apparatus 100 or the captured user image according to an embodiment will be described below.

FIG. 9 is diagram illustrating an example of performing a scene understanding of an image acquired in an electronic apparatus according to an embodiment.

As illustrated in FIG. 9, if the electronic apparatus 100 acquires an image 910, the electronic apparatus 100 inputs a plurality of image frames forming the acquired image 910 to an AI model and acquires a feature value regarding the plurality of input image frames.

For example, the image 910 may be an image received from an external apparatus such as a content server (not illustrated) or an image captured through a camera (not illustrated).

If the feature value regarding the plurality of image frames forming the image 910 is acquired, the electronic apparatus 100 acquires image information 920 regarding each of the image frames based on the feature value acquired from the plurality of image frames.

For example, the image information 920 may include information regarding an object included in the image frames, color information, location information regarding an object, etc.

The electronic apparatus acquires movement information 930 regarding a pre-defined specific object among objects included in the image information regarding each of the image frames based on the feature value acquired from the plurality of image frames. For example, the pre-defined specific object may be a representative object among objects included in each image frame.

Further, when a user voice signal related to the image 910 is received, the electronic apparatus 100 acquires voice information 940 regarding the user voice signal by performing voice recognition regarding the received user voice signal using, for example, and without limitation, a Mel Frequency Cepstral Coefficient (MFCC) algorithm.

In addition, the electronic apparatus 100 may further acquire category information 950 input from a user in relation to the image 910. For example, the category information 950 is provided to perform a scene understanding regarding the image 910 within the corresponding category information 950, and through such category information 950, the speed of scene understanding regarding the image 910 can be improved.

If at least one of the image information 920, the movement information 930 regarding a specific object, the voice information 940 and the category information is acquired, the electronic apparatus 100 may perform a scene understanding regarding a behavior included in the image 910 using the acquired information.

The electronic apparatus 100 generates a sentence related to a behavior included in the image 910 based on the scene understanding regarding the image 910.

For example, the electronic apparatus 100 may generate a sentence related to a behavior included in the image 910 using, for example, and without limitation, a Recurrent Neural Network (RNN) in the method of Long Short-term Memory (LSTM) 960.

As described above, the RNN model in the LSTM method may be a model for inputting long-term stored data and short-term stored data, respectively, and outputting the resultant value according to the input.

Accordingly, the electronic apparatus 100 may generate a sentence related to a behavior included in the image 910 by inputting various information which is acquired from the image 910 to the RNN model of the LSTM method.

So far, the operation of automatically reproducing an image according to a user behavior in the electronic apparatus 100 according to an embodiment has been described in detail. Hereinafter, the operation of updating the above-mentioned AI learning model in greater detail.

Figure 10:
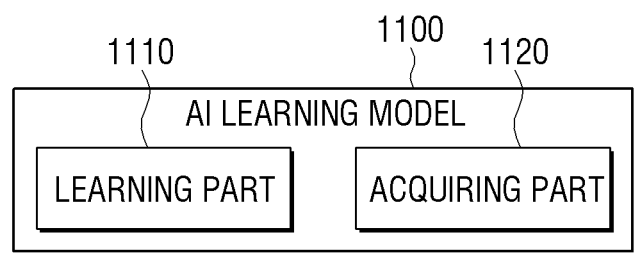
FIG. 10 is a block diagram illustrating an example processor of an example electronic apparatus that updates and uses an artificial intelligence (AI) learning model according to an embodiment.

FIG. 10 is a block diagram illustrating an example processor of an electronic apparatus that updates and uses an AI learning model according to an embodiment.

As illustrated in FIG. 10, a processor 1110 may further include at least one of a learning part (e.g., including processing circuitry and/or executable program elements) 1110 and an acquiring part (e.g., including processing circuitry and/or executable program elements) 1120 of an AI learning model.

The processor 1100 may correspond to the processor 140 of the electronic apparatus 100 in FIGS. 1 and 2.

The learning part 1110 may include various processing circuitry and/or executable program elements and generate or train a model (hereinafter, referred to as the first model) for recognizing an object included in a plurality of image frames forming an image input to the electronic apparatus 100 using learning data.

In addition, the learning part 1110 may generate or train a model (hereinafter, referred to as the second model) for acquiring a keyword regarding a user voice. The learning part 1110 may generate a trained model having recognition criteria using the collected learning data.

For instance, the learning part 1110 may generate, train or update the first model for acquiring information regarding a plurality of objects included in the corresponding image frame using a plurality of image frames forming the image input to the electronic apparatus 100 as input data.

In addition, the learning part 1110 may generate, train or update the second model for acquiring a keyword which is used to perform a scene understanding regarding the corresponding image using at least one of image information acquired from the image, movement information regarding a specific object, voice information related to the corresponding image, and category information as input data.

The acquiring part 1120 may include various processing circuitry and/or executable program elements and acquire various information using predetermined data as input data of a trained model.

For instance, the acquiring part 1120 may acquire (or recognize, estimate) information regarding a plurality of objects included in a plurality of images forming the corresponding image using a plurality of image frames forming the input image as input data of the trained first model.

In addition, the acquiring part 1120 may acquire (or estimate, infer, recognize) a keyword used to perform a scene understanding of an image using at least one of image information acquired from the image, movement information regarding a specific object, voice information related to the corresponding image, and category information as input data of the trained second model.

At least part of the learning part 1110 and at least part of the acquiring part 1120 may be implemented as a software module or produced in the form of at least one hardware chip, and mounted on the electronic apparatus 100. For example, at least one of the learning part 1110 and the acquiring part 1120 may be produced in the form of a hardware chip dedicated for AI or may be part of a conventional general processor (e.g., CPU or application processor) or a graphics-only processor (e.g., GPU) and mounted on the above-described various electronic apparatuses. In this example, the hardware chip dedicated for AI is a processor specialized in probability calculation, and it has a higher parallel processing performance than the general purpose processor, so that the operation work in AI field such as machine learning can be processed quickly.

If the learning part 1110 and the acquiring part 1120 are implemented as a software module (or a program module including an instruction), the software module may be stored in a non-transitory computer readable media which can be read by a computer. In this example, the software module may be provided by an Operating System (OS) or a specific application. In addition, part of the software module may be provided by the OS and the remaining part may be provided by a specific application.

The learning part 1110 and the acquiring part 1120 may be mounted on one electronic apparatus 100, or may be mounted on separate electronic apparatuses. For instance, one of the learning part 1110 and the acquiring part 1120 may be included in the electronic apparatus 100, and the other one may be included in an external server (not illustrated). In addition, the learning part 1110 and the acquiring part 1120 may provide model information established by the learning part 1110 to the acquiring part 1120 via cable or wirelessly, or the data input to the learning part 1110 may be provided to the learning part 1110 as additional learning data.

Figure 11A:
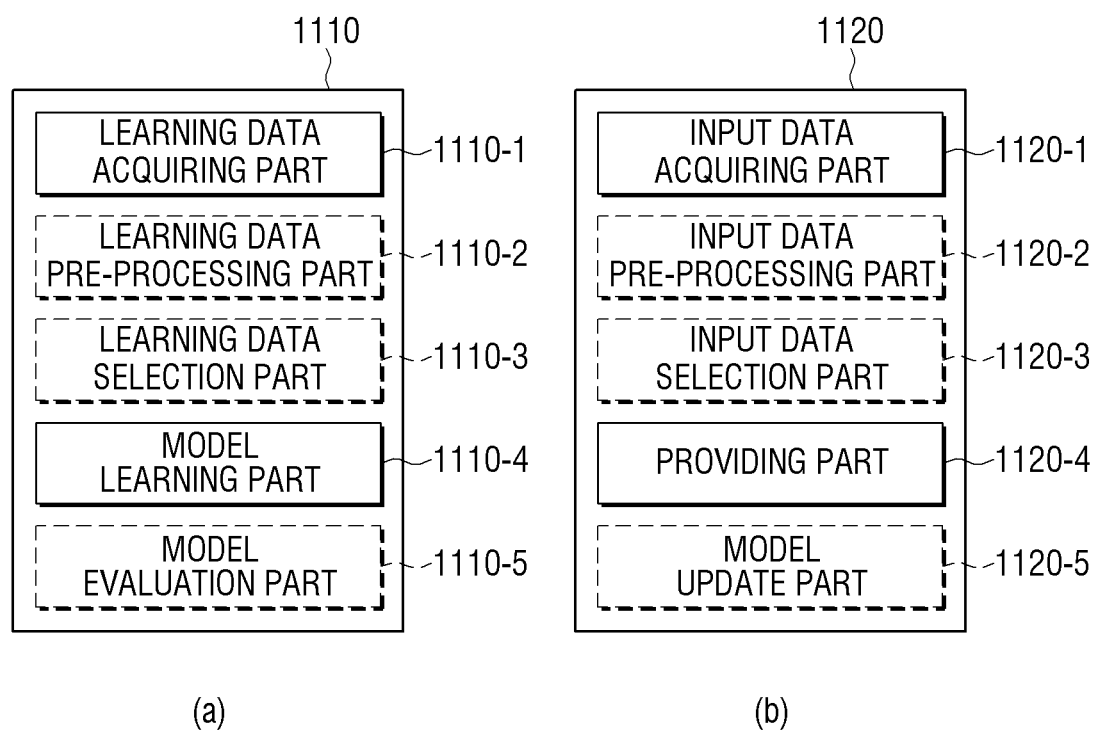
FIG. 11A is a block diagram illustrating an example learning part and an example acquiring part according to an embodiment.

FIG. 11A is a block diagram illustrating an example learning part and an example acquiring part according to an embodiment.

As illustrated in (a) of FIG. 11A, the learning part 1110 may include a learning data acquiring part (e.g., including various processing circuitry and/or executable program elements) 1110-1 and a model learning part (e.g., including various processing circuitry and/or executable program elements) 1110-4. In addition, the learning part 1110 may selectively further include at least one of a learning data pre-processing part (e.g., including various processing circuitry and/or executable program elements) 1110-2, a learning data selection part (e.g., including various processing circuitry and/or executable program elements) 1110-3, and a model evaluation part (e.g., including various processing circuitry and/or executable program elements) 110-5.

The learning data acquiring part 1110-1 may include various processing circuitry and/or executable program elements and acquire learning data necessary for the first model and the second model. According to an embodiment, the learning data acquiring part 1110-1 may acquire image data, information regarding a plurality of objects, user information, user voice, etc. as learning data. The learning data may be data which is collected or tested by the learning part 1110 or a manufacturer of the learning part 1110.

The model learning part 1110-4 may include various processing circuitry and/or executable program elements and train a criterion as to how to recognize objects included in a plurality of image frames forming an image using learning data. For instance, the model learning part 1110-4 may train an AI learning model through supervised learning using at least some of the learning data as a criterion among learning data. Alternatively, the model learning part 1110-4 may train an AI learning model through unsupervised learning which finds a criterion for determining circumstances by learning through learning data without any particular supervision.

As another example, the model learning part 1110-4 may train an AI learning model through reinforcement learning which uses feedback on whether the result of determining circumstances according to learning is correct. In addition, the model learning part 110-4, for example, may train an AI learning model using a learning algorithm including an error back-propagation method or a gradient descent method, etc.

If there are a plurality of pre-established AI models, the model learning part 1110-4 may identify an AI learning model with high relevance between input learning data and basic learning data as an AI learning model to learn. In this case, the basic learning data may be pre-classified according to the type of data, and the AI model may be pre-established according to the type of data.

For instance, the basic learning data may be pre-classified by various criteria such as an area where the learning data is generated, a time at which the learning data is generated, a size of the learning data, a genre of the learning data, a creator of the learning data, a type of object in the learning data, etc.

Once an AI learning model is trained, the model learning part 1110-4 may store the trained AI learning model. In this example, the model learning part 1110-4 may store the trained AI learning model in the memory 150 of the electronic apparatus 100. The model learning part 1110-4 may store the trained AI learning model an AI server (not illustrated) connected to the electronic apparatus 100 via a cable or a wireless network.

The learning part 1110 may further comprise the learning data pre-processing part 1110-2 and the learning data selection part 1110-3 in order to improve a recognition result of an AI learning model or save resources or time required to generate an AI learning model.

The learning data pre-processing part 1110-2 may include various processing circuitry and/or executable program elements and pre-process obtained data so that the obtained data can be used for obtaining information regarding objects and learning for keyword generation. The learning data pre-processing part 1110-2 may process the corresponding data to a predetermined format so that the model learning part 1110-4 can use the obtained data to obtain information regarding objects.

The learning data selection part 1110-3 may include various processing circuitry and/or executable program elements and select data required for learning between the data acquired from the learning data acquiring part 1110-1 and the data pre-processed from the learning data pre-processing part 1110-2. The selected learning data may be provided to the model learning part 1110-4.

The learning data selection part 1110-3 may select data required for leaning from obtained or pre-processed data according to predetermined selection criteria. In addition, the learning data selection part 1110-3 may select learning data according to predetermined selection criteria by learning of the model learning part 1110-4.

The learning part 1110 may further comprise the model evaluation part 1110-5 to improve a recognition result of an AI learning model.

The model evaluation part 1110-5 may include various processing circuitry and/or executable program elements and input evaluation data to an AI learning model, and if the recognition result output from the evaluation data does not satisfy predetermined criteria, allow the model learning part 1110-4 to learn again. In this case, the evaluation data may be predefined data for evaluation an AI model.

For instance, if the number or the ratio of the evaluation data whose recognition result is not accurate among the recognition results of a trained AI learning model for the evaluation data exceeds a predetermined threshold value, the model evaluation part 1110-5 may evaluate that predetermined criteria are not satisfied On the other hand, if there are a plurality of trained AI learning models, the model evaluation part 1110-5 may evaluate whether each of the trained AI learning models satisfies the predetermined criteria and determine the model which satisfies the predetermined criteria as the final AI learning model. In this case, when there are a plurality of learning models satisfying the predetermined criteria, the model evaluating part 1110-5 may determine any one or a predetermined number of models previously set in descending order of the evaluation score as the final AI learning model.

The acquiring part 1120 may comprise the input data acquiring part (e.g., including various processing circuitry and/or executable program elements) 1120-1 and the providing part (e.g., including various processing circuitry and/or executable program elements) 1120-4 as illustrated in (b) of FIG. 11A.

In addition, the acquiring part 1120 may selectively further comprises at least one of an input data pre-processing part (e.g., including various processing circuitry and/or executable program elements) 1120-2, an input data selection part (e.g., including various processing circuitry and/or executable program elements) 1120-3 and a model update part (e.g., including various processing circuitry and/or executable program elements) 1120-5.

The input data acquiring part 1120-1 may include various processing circuitry and/or executable program elements and acquire data required for acquiring information regarding objects included in a plurality of image frames forming an image.

The providing part 1120-4 may include various processing circuitry and/or executable program elements and acquire information regarding objects included in a plurality of image frames forming an image by applying the acquired input data to a trained AI learning model as an input value.

The providing part 1120-4 may acquire a recognition result by applying data selected by the input data pre-processing part 1120-2 which will be described later or the input data selection part 1120-3 to an AI learning model as an input value. The recognition result may be determined by an AI learning model.

According to an embodiment, the providing part 1120-4 may acquire (or estimate) information regarding objects included in a plurality of image frames forming an image by applying the image-related data acquired from the input data acquiring part 1120-1 to the trained first model.

According to another embodiment, the providing part 1120-4 may acquire (or estimate) a keyword regarding an object corresponding to a user voice by applying information regarding an object acquired from the input data acquiring part 1120-1, user information, user voice, etc. to the trained second model.

The acquiring part 1120 may further comprise the input data pre-processing part 1120-2 and the input data selection part 1120-3 in order to improve a recognition result of an AI learning model or save resources or time for providing a recognition result.

The input data pre-processing part 1120-2 may include various processing circuitry and/or executable program elements and pre-process obtained data so that the obtained data can be used to be input to the first model and the second model. The input data pre-processing part 1120-2 may process the obtained data to a predetermined format so that the providing part 1120-4 can use the obtained data to obtain information regarding objects and generate a keyword.

The input data selection part 1120-3 may include various processing circuitry and/or executable program elements and select data required for identifying circumstances learning between the data acquired from the input data acquiring part 1120-1 and the data pre-processed from the input data pre-processing part 1120-2. The selected data may be provided to the providing part 1120-4. The input data selection part 1120-3 may select part or all of the acquired or pre-processed data according to predetermined selection criteria for identifying circumstances. In addition, the input data selection part 1120-3 may select data according to predetermined selection criteria by learning of the model learning part 1120-4.

The model update part 1120-5 may include various processing circuitry and/or executable program elements and control an AI model to be updated based on evaluation regarding a recognition result provided by the providing part 1120-4.

For instance, the model update part 1120-5 may request the model learning part 1120-4 to additionally learn or update an AI learning model by providing the recognition result provided by the providing part 1120-4 to the model learning part 1120-4.

Figure 11B:
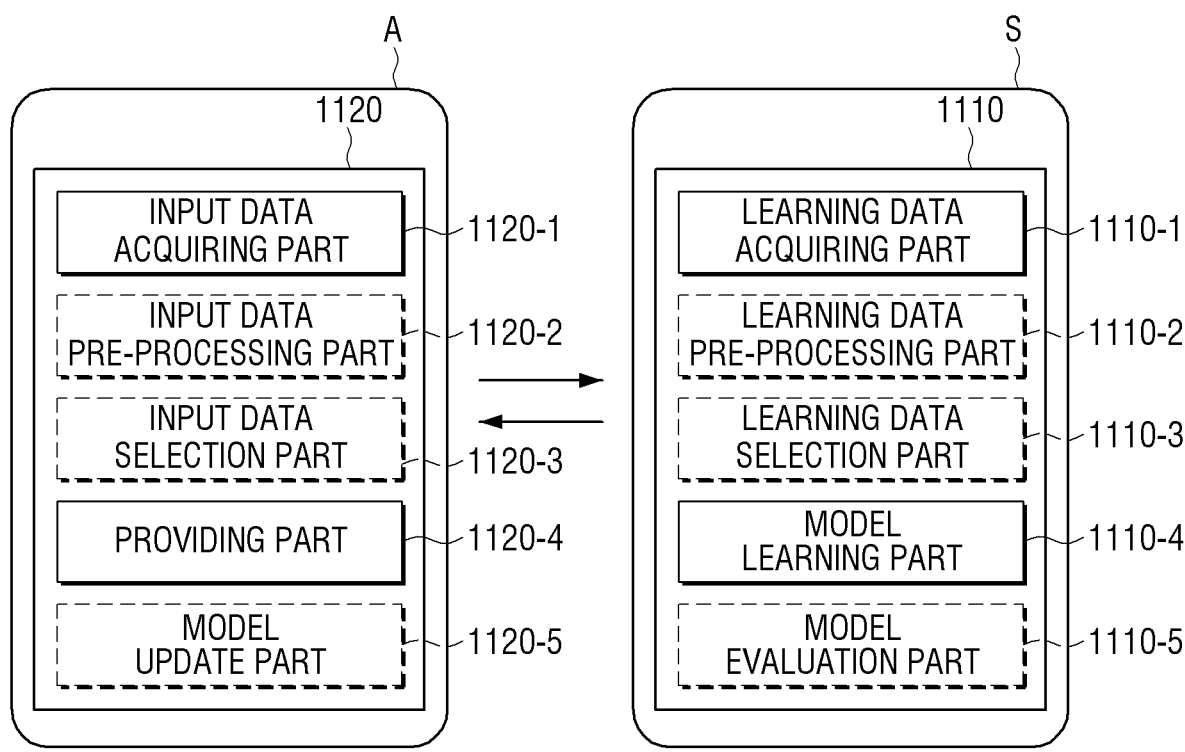
FIG. 11B is diagram illustrating an example of an example electronic apparatus and an example external server cooperating with each other to learn and identify data according to an embodiment.

FIG. 11B is a diagram illustrating an example electronic apparatus and an example external server cooperating with each other to learn and identify data according to an embodiment.

As illustrated in FIG. 11B, an external server S acquires information regarding a plurality of objects included in a plurality of frames forming an image. In addition, the external server S may learn criteria for acquiring a keyword regarding an object corresponding to a user voice.

The electronic apparatus A acquire not only information regarding a plurality of objects included in a plurality of image frames forming an image using models which are generated based on a learning result by the server S but also various keywords regarding objects.

In this case, the model learning part 1110-4 of the server S may perform the function of the learning part 1110 illustrated in FIG. 10. The model learning part 1110-4 of the server S may learn the determination criteria (or recognition criteria) of the first model and the second model.

In addition, the providing part 1120-4 of the electronic apparatus A may acquire not only information regarding objects included in a plurality of image frames forming an image by applying data selected by the input data selection unit 1120-3 to the AI learning model which is generated by the server S but also acquire various keywords regarding objects.

In addition, the providing part 1120-4 of the electronic apparatus A may receive the AI learning model which is generated by the server S, and acquire not only information regarding objects included in a plurality of image frames forming an image using the received AI learning model but also various keywords regarding objects.

The operation of identifying objects included in a plurality of image frames forming an image using an AI learning model in the electronic apparatus 100 according to an embodiment has been described in detail.

Hereinafter, the operation of recognizing a user voice input to the electronic apparatus 100 will be described.

Figure 12:
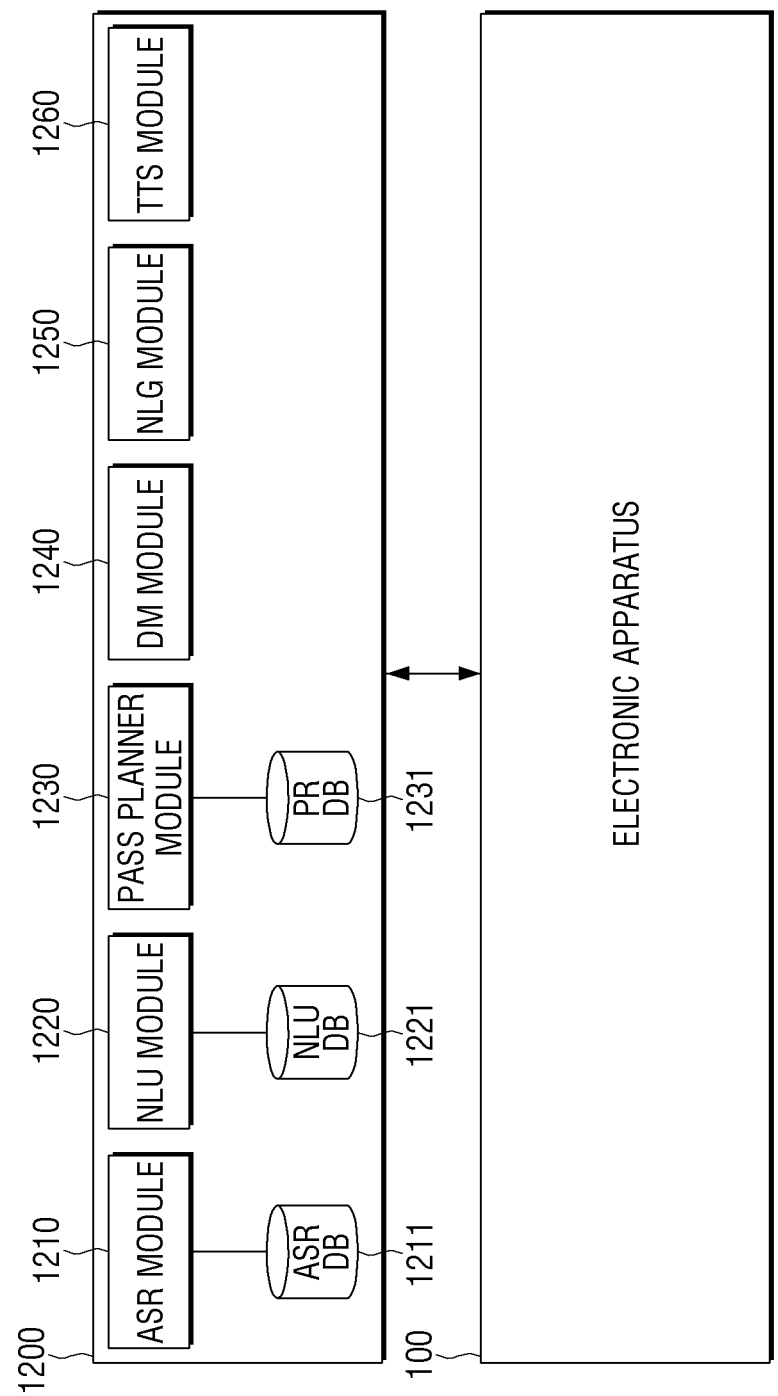
FIG. 12 is a block diagram illustrating an example intelligent server that recognizes a user utterance voice command input to an electronic apparatus according to an embodiment.

FIG. 12 is a block diagram illustrating an example intelligent server that recognizes a user utterance voice command input to an electronic apparatus according to an embodiment.

As illustrated in FIG. 12, an intelligent server 1200 may include an automatic speech recognition (ASR) module (e.g., including various processing circuitry and/or executable program elements) 1210, a natural language understanding (NLU) module (e.g., including various processing circuitry and/or executable program elements) 1220, a pass planner module (e.g., including various processing circuitry and/or executable program elements) 1230, a dialogue manager (DM) module (e.g., including various processing circuitry and/or executable program elements) 1240, a natural language generator (NLG) module (e.g., including various processing circuitry and/or executable program elements) 1250, and/or a text to speech (TTS) module (e.g., including various processing circuitry and/or executable program elements) 1260.

The NLU module 1220 or the pass planner module 1230 of the intelligent server 1200 may include various processing circuitry and/or executable program elements and generate a pass rule.

According to an embodiment, the ASR module 1210 may include various processing circuitry and/or executable program elements and convert a user voice command received from the electronic apparatus 100 into text data. For instance, the ASR module 1210 may include a speech recognition module. For example, the speech recognition module may include an acoustic model and a language model. For example, the acoustic model may include information regarding speech, and the language model may include information regarding unit phoneme information and a combination of unit phoneme information. The speech recognition module may convert a user voice into text data sing information regarding speech and information regarding unit phoneme information. The information regarding the acoustic model and the language model, for example, may be stored in automatic speech recognition database (ASR DB) 1211.

According to an embodiment, the NLU module 1220 may include various processing circuitry and/or executable program elements and may perform a syntactic analysis or a semantic analysis to identify the user's utterance intention. The syntactic analysis comprises dividing the user speech voice command into grammatical units (e.g., words, phrases, morphemes, etc.), and analyzing what grammatical elements each of the divided units has. The semantic analysis may perform semantic matching, rule matching, formula matching, etc. The NLU module 1220 may acquire a parameter (or a slot) required for a user voice command to represent a domain, an intent or an intention.

According to an embodiment, the NLU module 1220 may determine a user's utterance intention or parameter by using a matching rule that is divided into a domain, an intent, and a parameter (or a slot) required to identify an intent. For instance, one domain (e.g., an alarm) may include a plurality of intentions (e.g., alarm setting, alarm releasing, etc.), and one intent may include a plurality of parameters (e.g., time, number of repetitions, alarm sound, etc.). A plurality of rules, for example, may include one or more essential parameters. The matching rule may be stored in a NLU DB 1221.

According to an embodiment, the NLU module 1220 may identify the meaning of words extracted from a user voice command using linguistic features (e.g., grammatical elements) such as morphemes, phrases, and the like, and identify the user's utterance intention by matching the identified meaning of words with a domain and an intent. For instance, the NLU module 1220 may identify the user's utterance intention by calculating how many words extracted from the user voice command are included in each domain and intent.

According to an embodiment, the NLU module 1220 may identify a parameter of a user voice command using words which are used as bases for identifying the intention. According to an embodiment, the NLU module 1220 may identify the user's utterance intention using the NLU DB 1221 which stores linguistic features to identify the user's utterance intention.

According to another embodiment, the NLU module 1220 may identify the user's utterance intention using a personal language model (PLM). For instance, the NLU module may identify the user's utterance intention using personal information (e.g., a contact list, a music list). The PLM, for example, may be stored in the NLU DB 1221.

According to an embodiment, not only the NLU module 1220 but also the ASR module 1210 may recognize a user's voice command with reference to the PLM stored in the NLU DB 1221.

According to an embodiment, the NLU module 1220 may generate a pass rule based on the user's utterance intention and parameter. For instance, the NLU module 1220 may select an application to be executed based on the user's utterance intention and determine an operation to be performed in the selected application. The NLU module 1220 may generate a pass rule by identifying a parameter corresponding to the determined operation.

According to an embodiment, the pass rule generated by the NLU module 1220 may include information regarding an application to be executed, an operation to be executed and a parameter required for executing the operation.

According to an embodiment, the NLU module 1220 may generate one or multiple pass rules based on the user's utterance intention and parameter. For instance, the NLU module 1220 may receive a set of pass rules corresponding to the electronic apparatus 100 from the pass planner module 1230, and determine a pass rule by mapping the user's utterance intention and parameter to the received set of pass rules.

According to another embodiment, the NLU module 1220 may generate one or multiple pass rules by determining an application to be executed based on the user's utterance intention, an operation to be executed in the application and a parameter required for executing the operation. For instance, the NLU module 1220 may generate a pass rule by arranging the application to be executed and the operation to be executed in the application in the form of ontology or graph model according to the user's utterance intention using information regarding the electronic apparatus 100. The generated pass rule, for example, may be stored in a pass rule database (PR DB) 1231 through the pass planner module 1230. In addition, the generated pass rule may be added to the set of pass rules of the database 1231.

According to an embodiment, the NLU module 1220 may select at least one pass rule among the generated plurality of pass rules. For instance, the NLU module 1220 may select an optimum pass rule among the plurality of pass rules. According to another example, the NLU module 1220 may select a plurality of pass rules if only some operations are specified based on the user's speech voice command. The NLU module 1220 may determine one of the plurality of pass rules according to the user's additional voice command.

According to an embodiment, the NLU module 1220 may transmit a pass rule to the electronic apparatus 100 according to a user voice command. For instance, the NLU module 1220 may transmit one pass rule corresponding to a user voice command to the electronic apparatus 100.

According to another embodiment, the NLU module 1220 may transmit a plurality of pass rules corresponding to a user command to the electronic apparatus 100. Here, the plurality of pass rules, for example, may be generated by the NLU module 1220 if only some operations are specified based on the user voice command.

According to an embodiment, the pass planner module 1230 may include various processing circuitry and/or executable program elements and may select at least one pass rule among a plurality of pass rules.

According to an embodiment, the pass planner module 1230 may transmit a set of pass rules including a plurality of pass rules to the NLU module 1220. The plurality of pass rules of the set of pass rules may be stored in the PR DB 1231 connected to the pass planner module 1230 in the form of a table. For example, the pass planner module 1230 may transmit a set of pass rules corresponding to the information (e.g., OS information, application information) of the electronic apparatus 100 to the NLU module 1220. For example, the table stored in the PR DB 1231, for example, may be stored for each domain or for each version of domains.

According to an embodiment, the pass planner module 1230 may select one or multiple pass rules from the set of pass rules and transmit the same to the NLU module 1220. For instance, the pass planner module 1230 may select one or a plurality of pass rules by matching the user's utterance intention and parameter with the set of pass rules corresponding to the electronic apparatus 100, and transmit the same to the NLU module 1220.

According to an embodiment, the pass planner module 1230 may generate one or a plurality of pass rules using the user's utterance intention and parameter. For instance, the pass planner module 1230 may generate one or a plurality of pass rules by determining an application to be executed based on the user's utterance intention and parameter and an operation to be executed in the corresponding application.

According to an embodiment, the pass planner module 1230 may store pre-generated pass rules in the database 1231.

According to an embodiment, the pass planner module 1230 may store pre-generated pass rules in the PR DB 1231.

According to an embodiment, the pass planner module 1230 may store the pass rules generated by the NLU module 1220 in the database 1231. As such, the generated pass rules may be added to the set of pass rules stored in the PR DB 1231.

According to an embodiment, the table stored in the PR DB 1231 may include a plurality of pass rules or a plurality of sets of pass rules. The plurality of pass rules and the plurality of sets of pass rules may reflect the kind, version, type, or characteristic of the device that performs each pass rule.

According to an embodiment, the DM module 1240 may include various processing circuitry and/or executable program elements and may determine whether the user's utterance intention analyzed by the NLU module 1220 is accurate. For instance, the DM module 1230 may determine whether the user's utterance intention is accurate based on whether there is enough parameter information. The DM module 1240 may determine whether the parameter analyzed by the NLU module 1220 is enough to perform a task.

According to an embodiment, if the user's utterance intention is not accurate, the DM module 1240 may perform feedback requesting the user for the required information. For instance, the DM module 1240 may perform feedback requesting information regarding the parameter to identify the user's utterance intention.

According to an embodiment, the DM module 1240 may include a multimedia content provider module. For example, if the multimedia content providing module may perform an operation based on the intention and parameter identified by the NLU module 1220, the multimedia content providing module may generate a result of performing a task corresponding to the user voice command.

According to an embodiment, the DM module 1240 may transmit a result generated from the multimedia content providing module in response to a user voice command to the electronic apparatus 100.

According to an embodiment, the NLG module 1250 may include various processing circuitry and/or executable program elements and may convert designated information to the form of a text. For example, the information changed into the text form may be in the form of a natural language utterance. The designated information, for example, may be information regarding an additional input, information guiding completion of an operation corresponding to a user voice command or information guiding a user's additional voice command (e.g., feedback information regarding a user input). In addition, the information changed into the text form may be transmitted to the electronic apparatus 100 and displayed on the display, or may be transmitted to a text-to-speech conversion module (TTS module) 1260 and changed to a voice form.

According to an embodiment, the TTS module 1260 may include various processing circuitry and/or executable program elements and may change information of a text form to information of a voice form. The TTS module 1260 may receive information of a text form from the NLG module 1250, change the received text form information to voice form information, and transmit the same to the electronic apparatus 100. The electronic apparatus 100 may output the transmitted information of the voice form through a speaker.

According to an embodiment, the NLU module 1220, the pass planner module 1230 and the DM module 1240 may be implemented as a single module. For instance, the NLU module 1220, the pass planner module 1230 and the DM module 1240 may be implemented as a single module to determine the user's utterance intention and parameter and generate a response (e.g., pass rule) corresponding to the determined user's utterance intention and parameter. Accordingly, the generated response may be transmitted to the electronic apparatus 100.

The various embodiments of the disclosure may be implemented as software including one or more instructions stored in a storage medium which can be read by machine (e.g., a computer). For instance, the machine may call at least one instruction from among the stored one or more instructions from the storage medium and perform an operation according to the instruction, and may include an electronic apparatus (e.g., electronic apparatus 100) according to embodiments. When the instruction is executed under the control of the processor, the processor directly or using other components under the control of the processor may perform a function corresponding to the instruction. The one or more instructions may include a code generated by a complier or a code that may be executed by an interpreter. The storage medium which can be read by machine may be provided in the form of a non-transitory storage medium. Here, 'non-transitory' merely means that the storage medium is a tangible device and does not include a signal, and this term is not used to distinguish a case where data is stored in the storage medium semi-permanently and a case where data is stored temporarily.

A method according to the various embodiments may be included in a computer program product and provided therein. The computer program product can be traded between a seller and a buyer as a product. The computer program product may be distributed in the form of a storage medium that can be read by machine (e.g., compact disc read only memory (CD-ROM), or may be distributed online (e.g., downloaded or uploaded) through an application store (e.g., PlayStore™) or directly between two user devices. In the case of online distribution, at least a portion of the computer program product may be at least temporarily stored in a storage medium such as a memory of a server of a manufacturer, a server of an application store, or a relay server, or may be temporarily generated.

According to the various embodiments, each component (e.g., a module or a program) according to the above-described various embodiments may include a single entity or a plurality of entities, and some of the sub-components described above may be omitted or other sub-components may be further included in the various embodiments. Alternatively or additionally, some components (e.g., modules or programs) may be integrated into one entity to perform functions, which are performed by the components prior to the integration, in the same or similar manner. Operations performed by a module, a program, or another component according to various embodiments may be performed in a sequential, parallel, iterative, or heuristic manner, at least some of the operations may be executed in a different order or omitted, or other operations may be added.

While various example embodiments of the disclosure have been illustrated and described, it will be understood that the various example embodiments are intended to be illustrative, not limiting, and that various changes in form and details may be made without departing from the true spirit and full scope of the disclosure.

What is claimed is:

1. A method of controlling an electronic apparatus, comprising:
acquiring contents and storing the contents in a memory;
identifying a first section of the contents related to a first behavior by analyzing the stored contents;
outputting contents of the identified first section;
acquiring a user image captured while the contents of the identified first section is output;
identifying whether the first behavior is completed by analyzing the user image; and
based on identifying that a user has completed the first behavior, outputting contents of a second section of the contents, the second section being a next section of the identified first section,
wherein the identifying the first section comprises:
inputting an image frame of an image included in the contents to a trained Artificial Intelligence (AI) model and acquiring a feature value of the input image frame;
performing scene understanding related to the first behavior based on the acquired feature value; and
identifying the first section related to the first behavior based on the performed scene understanding.

2. The method as claimed in claim 1, wherein the acquiring the user image comprises:
inputting an image frame of the user image to the trained AI model and acquiring a feature value of the input image frame of the user image; and
performing scene understanding regarding user behavior included in the user image based on the acquired feature value of the input image frame of the user image.

3. The method as claimed in claim 2, wherein the identifying whether the first behavior has been completed comprises: comparing a feature value of an image frame of an image of the first section with a feature value of an image frame of the user image.

4. The method as claimed in claim 2, wherein the identifying whether the first behavior has been completed comprises: identifying whether the first behavior has been completed based on scene understanding related to the first behavior and scene understanding regarding the user behavior.

5. The method as claimed in claim 4, wherein the outputting the contents of the identified first section comprises, based on identifying that the first behavior has not been completed, stopping reproduction of an image of the first section or repeatedly reproducing the image of the first section.

6. The method as claimed in claim 5, wherein the outputting the contents of the identified first section comprises, based on a behavior different from the first behavior being performed for a predetermined threshold time or longer while the reproduction of the image of the first section is stopped or the image of the first section is repeatedly reproduced, outputting an image of the second section.

7. The method as claimed in claim 2, further comprising: acquiring and displaying a sentence related to an image of the first section and the user image, respectively,
wherein the displaying comprises acquiring a first sentence by performing scene understanding regarding the first behavior included in an image of the first section, acquiring a second sentence by performing scene understanding regarding the user behavior included in the user image, and displaying the acquired first and second sentences in an area of a display in which an image of the first section is displayed.

8. The method as claimed in claim 7, wherein the identifying whether the first behavior has been completed comprises identifying whether the first behavior has been completed based on a similarity level of the first and second sentences.

9. The method as claimed in claim 8, wherein the outputting comprises, based on identifying that the first behavior has not been completed, outputting a message informing that a behavior different from the first behavior is being performed through at least one of an image or audio.

10. The method as claimed in claim 1, wherein the memory includes a buffer and a main memory, and
wherein the storing comprises storing the contents in the buffer, and based on a storage capacity of the buffer being insufficient, storing remaining contents which are not stored in the buffer in the main memory.

11. An electronic apparatus, comprising:
a photographing part comprising image capturing circuitry;
a memory configured to acquire contents and store the contents;
an outputter comprising output circuitry configured to output the contents; and
a processor configured to control the electronic apparatus to:
identify a first section of the contents related to a first behavior by analyzing the stored contents, and control the outputter to output contents of the identified first section,
acquire a user image captured while the contents of the identified first section is being output, and
identify whether the first behavior is completed by analyzing the user image, and based on identifying that a user has completed the first behavior, control the outputter to output contents of a second section of the contents, the second section being a next section of the identified first section,
wherein the processor is configured to control the electronic apparatus to: input an image frame of an image included in the contents to a trained Artificial Intelligence (AI) model to acquire a feature value of the input image frame, perform scene understanding related to the first behavior based on the acquired feature value, and identify the first section of the contents related to the first behavior based on the performed scene understanding.

12. The electronic apparatus as claimed in claim 11, wherein the processor is configured to control the electronic apparatus to: input an image frame of the user image to the trained AI model to acquire a feature value of the input image frame of the user image, and perform scene understanding regarding user behavior included in the user image based on the acquired feature value of the input image frame of the user image.

13. The electronic apparatus as claimed in claim 12, wherein the processor is configured to control the electronic apparatus to: identify whether the first behavior has been completed by comparing a feature value of an image frame of an image of the first section with a feature value of an image frame of the user image.

14. The electronic apparatus as claimed in claim 12, wherein the processor is configured to control the electronic apparatus to: identify whether the first behavior has been completed based on scene understanding related to the first behavior and scene understanding regarding the user behavior.

15. The electronic apparatus as claimed in claim 14, wherein the processor is configured to control the outputter to stop reproduction of an image of the first section or to repeatedly reproduce the image of the first section.

16. The electronic apparatus as claimed in claim 12, wherein the processor is configured to control the electronic apparatus to: acquire a first sentence by performing scene understanding regarding the first behavior included in an image of the first section, acquire a second sentence by performing scene understanding regarding the user behavior included in the user image, and control the outputter to display the acquired first and second sentences in an area of a display in which an image of the first section is displayed.

17. The electronic apparatus as claimed in claim 16, wherein the processor is configured to control the electronic apparatus to identify whether the first behavior has been completed based on a similarity level of the first sentence and the second sentence.

18. The electronic apparatus as claimed in claim 17, wherein the processor, based on identifying that the first behavior has not been completed, is configured to control the outputter to output a message informing that a behavior different from the first behavior is being performed through at least one of an image or audio.

* * * * *